US007634420B2

(12) United States Patent
Kendall et al.

(10) Patent No.: US 7,634,420 B2
(45) Date of Patent: Dec. 15, 2009

(54) SYSTEM FOR APPRAISING LIFE INSURANCE AND ANNUITIES

(75) Inventors: Errol O. Kendall, Atlanta, GA (US); James C. Brooks, Jr., Marietta, GA (US); Robert W Stein, New York, NY (US); Douglas A. French, Austin, TX (US); Francis de Regnaucourt, Morganville, NJ (US); Sharyn R Kohen, Scarsdale, NY (US); Charles L. Ratner, Pepper Pike, OH (US); Anson J. Glacy, Jr., West Hartford, CT (US)

(73) Assignee: Efficient Markets Corporation, Atlanta, GA (US)

( * ) Notice: Subject to any disclaimer, the term of this patent is extended or adjusted under 35 U.S.C. 154(b) by 1171 days.

(21) Appl. No.: 10/024,585

(22) Filed: Dec. 21, 2001

(65) Prior Publication Data

US 2003/0191672 A1    Oct. 9, 2003

(51) Int. Cl.
*G06Q 40/00*    (2006.01)
(52) U.S. Cl. ............................................ 705/4; 705/35
(58) Field of Classification Search .................... 705/4, 705/35
See application file for complete search history.

(56) References Cited

U.S. PATENT DOCUMENTS

| | | | |
|---|---|---|---|
| 5,291,398 A | 3/1994 | Hagan | |
| 5,375,055 A | 12/1994 | Togher et al. | |
| 5,655,085 A | 8/1997 | Ryan et al. | |
| 5,704,045 A | 12/1997 | King et al. | |
| 5,758,328 A | 5/1998 | Giovannoli | 705/26 |
| 5,839,118 A | 11/1998 | Ryan et al. | |
| 5,966,693 A | 10/1999 | Burgess | |
| 5,987,434 A * | 11/1999 | Libman | 705/36 R |
| 5,991,744 A | 11/1999 | DiCresce | |
| 6,119,093 A | 9/2000 | Walker et al. | |

(Continued)

FOREIGN PATENT DOCUMENTS

KR    2000-0050079    8/2000

(Continued)

OTHER PUBLICATIONS

"Rate of Return on Differential Premiums for Selected Participating Life Insurance Contracts" by Phyllis Schiller Myers and S. Travis Pritchett. The Journal of Risk and Insurance, vol. 50, No. 4. (Dec. 1983), pp. 569-586).*

(Continued)

*Primary Examiner*—Jagdish N Patel
*Assistant Examiner*—Sara Chandler
(74) *Attorney, Agent, or Firm*—McKenna Long & Aldridge LLP

(57) ABSTRACT

A method and system of appraising a life insurance or annuity product includes receiving a request for a life insurance or annuity product and information about a party requesting the life insurance or annuity product; preparing a bid solicitation for the life insurance or annuity product based on the request and information and transmitting the bid solicitation to a plurality of product carriers; a plurality of product carriers submitting initial proposals for providing the life insurance or annuity product; generating ratings for the initial proposals, respectively; and generating appraisals for the initial proposals; and informing the product carriers of the decision.

24 Claims, 3 Drawing Sheets

U.S. PATENT DOCUMENTS

| | | | |
|---|---|---|---|
| 6,233,566 | B1 | 5/2001 | Levine et al. |
| 6,332,129 | B1 | 12/2001 | Walker et al. ............... 705/26 |
| 6,456,979 | B1 | 9/2002 | Flagg |
| 6,684,189 | B1 | 1/2004 | Ryan et al. |
| 2001/0023404 | A1 | 9/2001 | Ogawa et al. ............... 705/4 |
| 2002/0007332 | A1 | 1/2002 | Johnson et al. |
| 2002/0091613 | A1 | 7/2002 | Kendall et al. |
| 2003/0191672 | A1 | 10/2003 | Kendall et al. |
| 2005/0027572 | A1 | 2/2005 | Goshert |

FOREIGN PATENT DOCUMENTS

| | | |
|---|---|---|
| WO | WO 91/20071 | 12/1991 |
| WO | WO 02/29650 A2 | 4/2002 |

OTHER PUBLICATIONS

"The Rate of Return on Universal Life Insurance" by Antony C. Cherin and Robert C. Hutchins. The Journal of Risk and Insurance, vol. 54, No. 4. (Dec. 1987), pp. 691-711.*

"Life Insurance Management Issues" by Stephen W. Forbes. The Journal of Risk and Insurance, vol. 54, No!. 3. (Sep. 1987), pp. 603-613.*

"Determinants of Universal Life Insurance Cash Values" by James M. Carson. The Journal of Risk and Insurance, vol. 63, No. 4, Symposium on Catastrophic Risk. (Dec. 1996), pp. 673-681.*

"Effects of Relationship Marketing on Satisfaction, Retention, and Prices in the Life Insurance Industry" by Lawrence A. Crosby and Nancy Stephens. Journal of Marketing Research, vol. 24, No. 4 (Nov. 1987).*

"Classifying Financial Distress in the Life Insurance Industry," by Ran BarNiv and Robert A. Hershbarger. The Journal of Risk and Insurance, vol. 57, No!. 1. (Mar. 1990), pp. 110-136).*

International Search Report; United States, Nov. 25, 2003.

Bragg Associates, Inc., *Acturial Counselling Report*, 1995, pp. 1-10.

Bragg Associates, Inc., *About the Bragg Index Methodology*, 1995, pp. 1-3.

Bragg Associates, Inc., *Bragg Index*, May 10, 1995, vol. 1, pp. 1-2.

Physician's Money Digiest, *Don't Get Ripped Off When Buying Life Insurance*, Feb. 1996, pp. 29-30.

Martin Weiss' Safe Money Report, *A new collapse in long-term bonds will make 1994 look like a picnic. Wait for yields of 9% or better before buying*, Jun. 14, 1995, Issue #254, pp. 1-2.

Consumer Reports, *Time to Think About Life Insurance*, Jul. 1993, pp. 431-450.

Consumer Reports; *Glasses; Life Insurance: Did Your Agent Lie To You?*;Aug. 1993, pp. 525-539.

Consumer Reports, *Survival Guide to Supermarkets*; Sep. 1993; pp. 555, 595-603.

The Bragg Index and Statusquote, *Differentiating KeyCorp's Life Insurance Business*, Atlanta, Georgia, Feb. 17, 1997; pp. 1-13.

National Underwriter, *The Life Industry Needs A Product-Rating System*, Apr. 17, 1996, pp. 11-12.

National Underwriter, *Black Box Alien's Been Sighted on Annuity Block*, Jul. 15, 1996, pp. 16.

National Underwriter, *Product Ratings May Be Closer Than You Think*, Oct. 28, 1996, pp. 23.

* cited by examiner

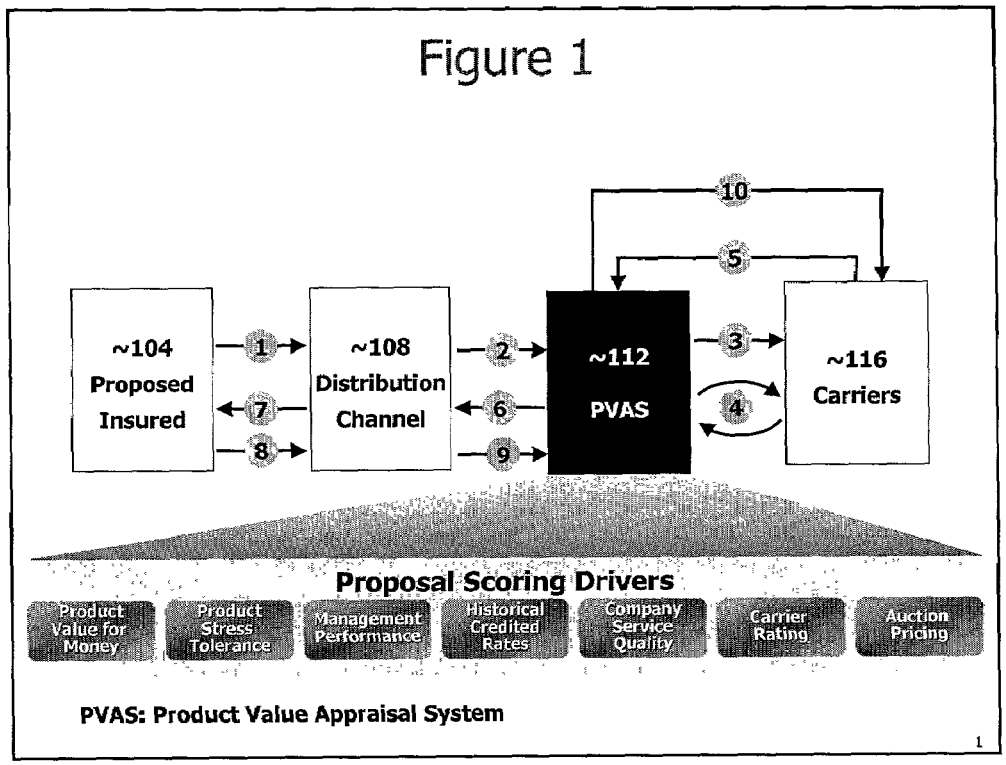
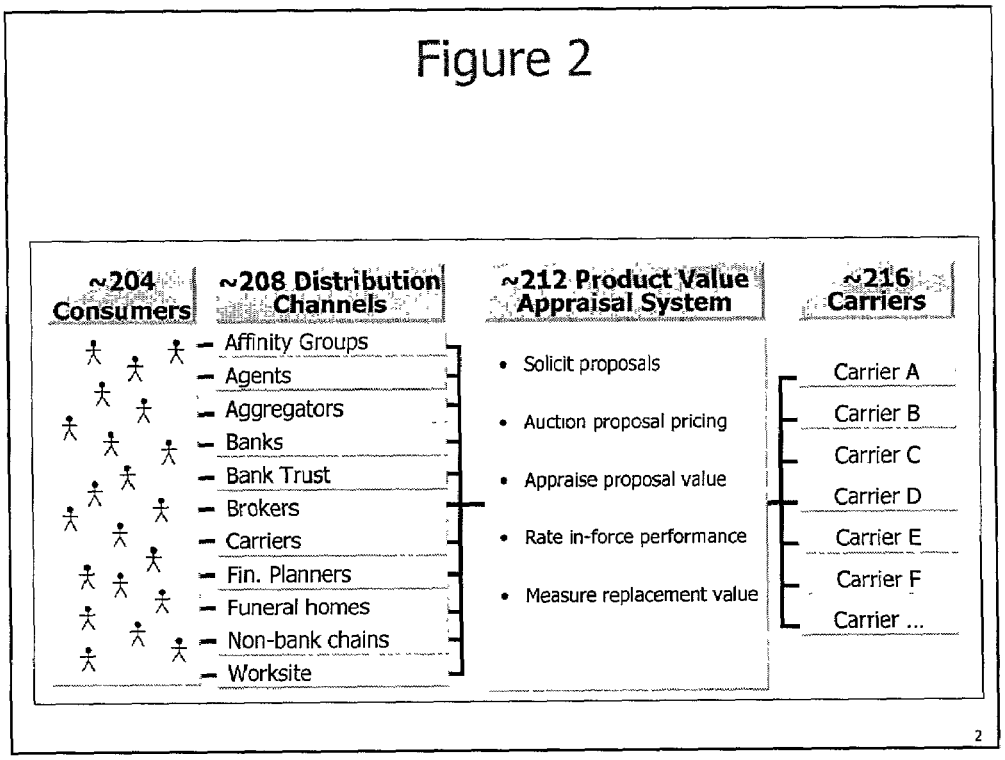

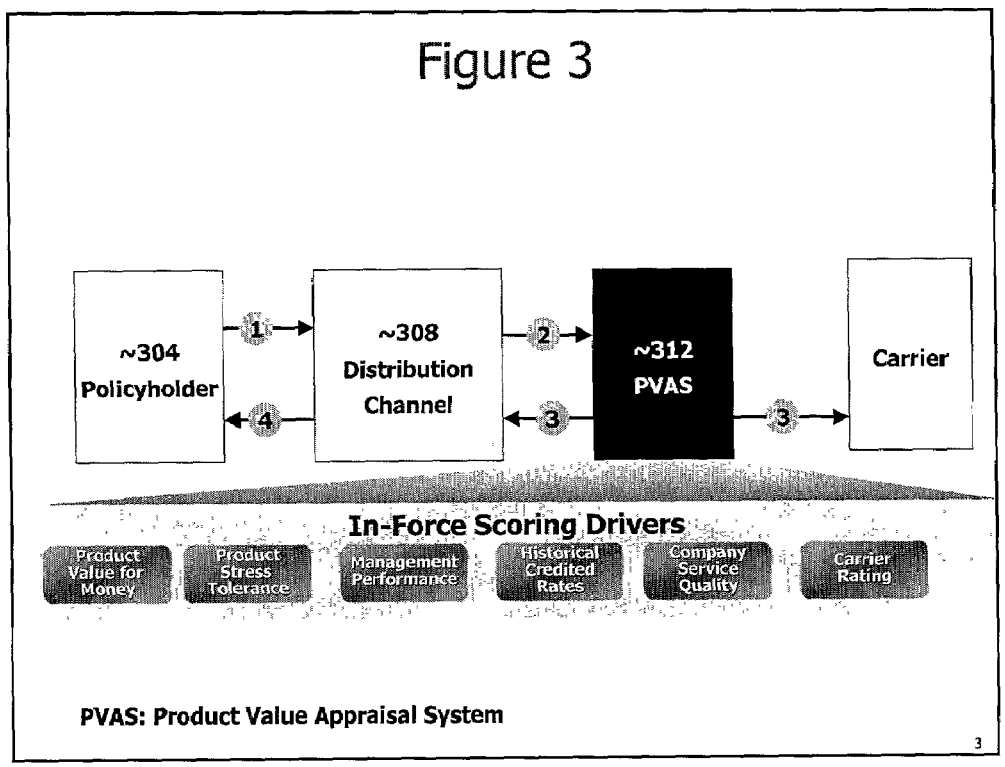
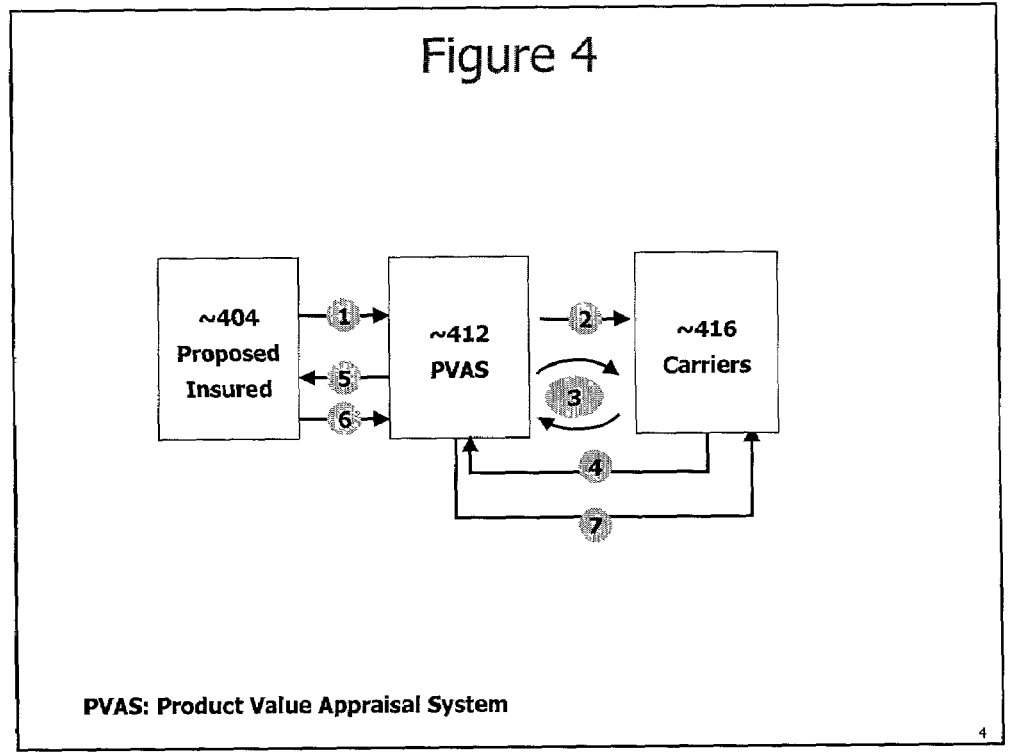

PVAS: Product Value Appraisal System

PVAS: Product Value Appraisal System

SYSTEM FOR APPRAISING LIFE INSURANCE AND ANNUITIES

BACKGROUND OF THE INVENTION

1. Field of the Invention

The present invention relates to an automated system for appraising value to consumers of a life insurance or annuity product, and more particularly, to a computer-based value appraising system.

2. Discussion of the Related Art

The financial services industry consists of industry segments such as insurance and banking. In turn, the insurance industry consists of industry segments such as life insurance, health insurance, and property and casualty insurance.

The life insurance industry includes product markets such as term life insurance, life insurance, variable life insurance, annuities, joint products, viatical settlements, preneed insurance, and long-term care insurance. Insurance carriers sell life insurance products through various distribution channels such as captive agents, independent agents, banks, affinity groups, and financial planners.

The present life insurance product markets for both insurance product proposals and in-force insurance products are inefficient. For insurance product proposals, the problem stems from: (1) an inadequate exchange of information between consumers and insurers during the selling process and, (2) the absence of a real-time auction market in which to price life insurance product proposals. Inefficient product markets for in-force insurance products stem from the absence of a system for measuring an insurance product's performance while that product is in-force.

An inadequate exchange of relevant and available information between consumers and insurers during the selling process is a significant source of product market inefficiency. Typically, consumers often do not receive relevant and available information necessary to make an informed purchase decision. Also, insurers frequently do not receive relevant and available information on the consumer and current market pricing necessary to tailor their proposals for optimal product performance and pricing. Such inefficient transmission of information results in product market inefficiency. Such product market inefficiency in the insurance industry adversely affects consumers and insurance companies.

Moreover, many life insurance products have complex features that consumers do not understand. Consumers' lack of insurance product knowledge opens the door to misleading sales practices such as twisting, churning, and vanishing premiums. Product "gimmickry," such as lapse basing, preys on a consumer's inability to detect its existence. Recent, widely publicized accounts of race-based underwriting indicate that market conduct problems can go undetected for years by consumers, insurance company managements, and insurance industry regulators. Insurance industry regulators have attempted to enforce market conduct standards. Insurance companies have sought to curtail sales abuses. Their efforts have not solved the problem.

Market conduct problems occur regardless of an insurance company's financial strength. Favorable financial ratings are no indication of an insurer's compliance with market conduct standards. Independent rating firms evaluate an insurer's claims paying ability. They do not rate the products sold by insurers. The life insurance industry has no product rating system that appraises a proposed insurance product's total value to the consumer.

These and other market conduct problems point to the need for a system that assists the consumer in appraising a proposed insurance product's value.

The absence of a real-time auction market in which to price life insurance product proposals is a source of product market inefficiency. Currently, whether life insurance products are sold on the Internet or sold offline, the products are sold in a "fixed-priced" market. Typically, during the sales process, consumers and insurers cannot obtain real-time, market pricing information for products that are tailored to individual consumer needs. Thus, both consumers and insurers are deprived of opportunities to improve pricing before the sale closes. Consequently, some insurance products may be priced too high. In other cases, product prices may be too low.

Some insurers presently post fixed pricing information for standard products on the Internet, making it easier for consumers to compare prices for certain products. The Internet has made available more pricing information to consumers than ever before. However, while price comparisons allow the consumer to seek the lowest price for such fixed-price products, these price comparisons provide no other information to allow for an appraisal of the total value proposition.

Similarly, existing policyholders have no means for evaluating the performance of their in-force insurance policies. No system exists in the marketplace for appraising an in-force product's continuing value to the consumer.

Moreover, price is only one element in appraising an insurance product's total value proposition. No available systems provide consumers with information other than price to facilitate informed purchase decisions. Consumers need a system that appraises the total value proposition of life insurance product proposals. Such a system would lead to stronger product market efficiency.

In addition, even though present systems allow for price shopping on the Internet by consumers, from the insurer's perspective, such price shopping commoditizes insurance products. Thus, insurers are forced to compete on price alone and cannot differentiate products that provide other "non-price" value for consumers. Consequently, the attractiveness of the industry's structure declines, competitor rivalry increases, weak product substitutes proliferate, and entry barriers become lower across product markets. These structural changes squeeze margins and erode industry-wide profitability.

SUMMARY OF THE INVENTION

Accordingly, the present invention is directed to an evaluating system for a life insurance or annuity product that substantially obviates one or more of the problems due to limitations and disadvantages of the related art.

An advantage of the present invention is to provide an on-line, real-time system for evaluating a proposed life insurance or annuity product.

An advantage of the present invention is to provide an on-line, real-time system for evaluating an in-force life insurance or annuity product.

An advantage of the present invention is to provide an on-line, real-time system for evaluating a replacement life insurance or annuity product.

Another advantage of the present invention is to provide a system that creates efficient product markets for the benefit of the life insurance industry and its customers.

Another advantage of the present invention is to provide a system that enables insurance companies and insurance distribution channels to better serve their customers and to improve industry-wide profitability Another advantage of the present invention is to provide a system to improve product pricing by pricing insurance products in an auction-style market.

Another advantage of the present invention is to provide a system for evaluating the current performance of an in-force life insurance or annuity product.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of appraising a life insurance or annuity product includes the steps of receiving a request for a life insurance or annuity product and information about a party requesting the product; preparing a bid solicitation for the product based on the request and information and transmitting the bid solicitation to a plurality of product carriers; at least one of the plurality of product carriers providing a proposal for providing the life insurance or annuity product; automatically generating a numerical rating corresponding to each proposal and providing the numerical rating to the corresponding product carrier; allowing the plurality of product carriers to revise the proposals based on the numerical rating; the product carriers providing a final proposal; and generating an appraisal for each of the final proposals.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram that illustrates a preferred embodiment of the present invention.

FIG. 2 is a block diagram that illustrates parties involved in a business transaction according to the preferred embodiment of the present invention.

FIG. 3 is a block diagram that illustrates an embodiment of the present invention appraising the continuing value proposition to the policyholder of an in-force life insurance policy or annuity.

FIG. 4 is a block diagram that illustrates an embodiment of the present invention for a policyholder to query a product value appraisal system without the aid of a distribution channel.

DETAILED DESCRIPTION OF THE PREFERRED EMBODIMENTS

Figure 5:
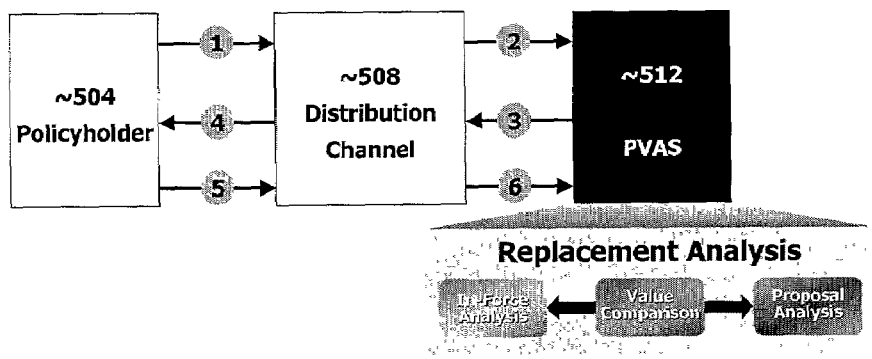
FIG. 5 is a block diagram that illustrates an embodiment of the invention appraising the value proposition for replacing an in-force life insurance policy or annuity.

Reference will now be made in detail to the preferred embodiments of the present invention, examples of which are illustrated in the accompanying drawings.

The present invention relates to an evaluating system for a life insurance or annuity product under consideration for purchase, the ongoing value of a life insurance or annuity product already owned, or replacing a life insurance or annuity product. In addition, either as a separate process or in conjunction with this process, the product value appraisal system of the present invention enables an on-line, real-time auction process for pricing life insurance and annuity products. The present invention provides a system for appraising a life insurance or annuity product's total value proposition to the consumer. The product value appraisal system operates preferably via the Internet, but may be configured to work off-line or via a closed network or Intranet. The system is configured to support all categories of insurance transactions including, business-to-business, business-to-consumer, and business-to-employee. The system appraises life insurance product and annuity proposals as well as life insurance and annuity products that are in-force and replacement product proposals.

The present invention is applicable to a number of financial products within the life insurance industry, as well as annuities. Within the market for life insurance, there are a variety of products for which a system for appraising value is most useful. Term life policies provide a death benefit for a limited number of years after which they expire without value. They may insure the life of one person, or provide protection on the lives of two people (Joint Term policies). Joint Term policies are of two types: those that pay the death upon the first death to occur and those that pay upon the second death during the term.

Term products may have non-guaranteed premium structures (participating policies that pay dividends or "indeterminate premium" plans that feature a guaranteed maximum premium scale, but provide for the opportunity to pay a lower current premium based on current experience of the insurer) or fully guaranteed premiums that never change (non-participating plans). Term plans that provide a death benefit that is a constant amount over the term period may be renewable at the end of the term (e.g., Annually Renewable Term, 5-Year Renewable Term, etc.). A subset of renewable term plans is Reentry Term, which provides the opportunity for a lower renewal premium than otherwise available if the insured can provide evidence of continuing good health. Non-renewable term plans include 20-Year Term and Term to Age 65. Term plans that provide a death benefit that decreases over the term period are generally non-renewable and are purchased to insure a specific need. Mortgage Protection Term, often sold in connection with new residential home loans is a good example.

Ordinary life insurance plans are conceptually designed to provide death protection for the insured's entire lifetime. Unlike term life, they commonly provide for the accumulation of cash values that are available to the insured should the policy need to be terminated prior to death. Premiums for Ordinary Life can be structured to be payable for life or some finite number of years. Single Premium Life forms are even available. All Ordinary Life plans are generally available in joint life insurance (first-to-die) and joint and last survivor insurance forms in addition to single life forms. In order of decreasing guarantees (increasing risk) to the purchaser, these plans fall into the following types: nonparticipating whole life, indeterminate premium whole life, participating whole life, interest sensitive whole life, universal life insurance, variable whole life and variable universal life.

Nonparticipating whole life provides for guaranteed level premiums and a guaranteed death benefit with fully guaranteed cash values. The insurer assumes all risks and the purchaser does not participate in experience more favorable than the insurer's guarantees.

Indeterminate premium whole life insurance is a version of nonparticipating whole life insurance with indeterminate premiums, which is discussed above with regard to term life insurance.

Participating whole life insurance is similar to nonparticipating whole life, but offers the opportunity to receive annual dividends from the insurer if experience is more favorable than guarantees.

Interest sensitive whole life insurance is a version of nonparticipating whole life insurance under which the insurer credits excess interest over and above the policy's guarantee to the policy's cash values as current conditions warrant.

Universal life insurance is a version of nonparticipating whole life under which the insurer provides guarantees as to maximum charges for expenses and the mortality risk and minimum interest rates, but the amount of premium is based on current charges and interest rates. Thus, the insured is assuming a fair amount of risk with respect to future experience, primarily concerning interest rates. Considerable flexibility is provided for changes in the amount and timing of premium payments and the amount of the death benefit as well the ability to make withdrawals from the cash values. There is consequently no guarantee that the policy will be in effect at the insured's death if proper adjustments are not made in the premium payment pattern. This is a significant difference from the four types of Ordinary Life described above.

Variable whole life insurance is a form of nonparticipating whole life under which the insured assumes substantially all of the investment risk, including the risk of fluctuations in principal value as well as the interest rate risk. Fixed level premiums are provided, but the death benefit and cash values fluctuate with the investment performance of the mutual funds selected by the insured for investment of the premiums. There is a minimum guaranteed death benefit payable whenever the insured's death occurs.

Variable universal life insurance is a combination of variable whole life insurance and universal life insurance. Variable universal life insurance represents the life product type with the fewest traditional insurer guarantees and thus the greatest assumption of risk by the insured. In return for assuming this risk, the insured has the upside potential of receiving a significant better value in favorable economic environments than under the other product types.

As shown in FIG. 1, the product value appraisal system of the present invention simultaneously solicits, prices, and rates life insurance and annuity policy proposals. FIG. 1 illustrates a "business-to-business" transaction.

A party seeking a life insurance or annuity product, the proposed insured 104, requests a life insurance or annuity product through a distribution channel 108 that sells such products to consumers, as illustrated by step 1 in FIG. 1. The proposed insured 104 also provides the distribution channel 108 with information necessary for the distribution channel to request proposals from carriers who sell that product type. This information includes the risk profile of the proposed insured 104 for the product. Demographic and risk profile data include, for example, the proposed insured's age, sex, smoking habits, amount of insurance or annuity benefit desired, the pattern of premium payments and the pattern of disbursements desired from the product.

Next, the distribution channel 108 transmits to a product value appraisal system ("PVAS") 112 information provided by the proposed insured 104, including the demographic and risk profile information as inputs to the product value appraisal system 112, as illustrated by step 2 of FIG. 1.

Then, the product value appraisal system 112 initiates bidding and/or invites proposals from interested product providers or carriers 116 by sending a proposed opening bid or invitation for proposal to a participating insurance carrier 116, as illustrated by step 3 of FIG. 1. The opening bid provided by the product value appraisal system 112 may include an opening price with a minimum product rating.

After initiating bidding or inviting proposals, the product value appraisal system 112 proceeds in an on-line, real-time, iterative process with the insurance carriers 116, as illustrated by step 4 of FIG. 1. Upon receipt of a bid or proposal from a participating insurance carrier 116, the product value appraisal system 112 reviews each bid or proposal and rates the bid or proposal and the pricing of each bid or proposal.

With each product proposal, the insurance carrier will transmit information about the price and benefits of its product along with identifying information about itself. This data includes data about the product's proposed benefits and price on both a guaranteed and illustrated basis, and information about the insurance company proposing the product. Product data include the proposed premiums to be paid and the proposed benefits to be provided, both distinguished between guaranteed amounts and illustrated amounts that depend on assumptions about the future. The insurance company information includes data that quantifies the financial strength of the insurance company. The product value appraisal system 112 will use appropriate actuarial assumptions, such as mortality information specific to the end customer's risk profile, and traditional actuarial present value methodology to determine a numeric rating of the benefits offered in light of the proposed price, the Product Value For Money, as represented in FIG. 1. Numeric ratings will also be assigned to other key scoring drivers: the product's performance under less optimistic assumptions about future interest rates and at lower premium levels (Product Stress Tolerance); various company financial information (Management Performance); previous interest rates actually credited to the product's values (Historical Credited Rates); various qualitative measures of customer service (Customer Service Quality); and the financial strength of the product provider (e.g., A.M. Best Rating). The numeric ratings for these six scoring drivers will then be weighed to arrive at an overall rating of the customer value proposition.

In one embodiment, a universal life insurance product, the first scoring driver, the product value for money, is determined using four metrics. The first and second metrics are based on projections of cash flow for groups of 1,000 policyholders. Each year, the system projects the number of policyholders dying, which is based on mortality tables appropriate for the gender, smoker status, and rating class of the insured, and the number of policyholders surrendering, which is based on lapse assumptions. Cash inflows consist of the premiums paid by survivors, and cash outflows consist of death and surrender benefits paid. The ratio of the present value of cash inflows to the present value of cash outflows is the cash-on-cash Internal Rate of Return (IRR). Two separate IRR calculations are made based on two different assumptions about lapses and surrender rates to provide the first and second metrics that make up the product value for money scoring driver.

The first IRR calculation is made based on lapse and surrender rates from the 1995 LIMRA life lapse rate study for the age and policy size of the client, i.e., empirical lapse and surrender rates. The second IRR calculation is made based on level lapse and surrender rates.

The third metric that factors into the product value for money scoring driver is the premium required to achieve the illustrated objective, typically the level premium to endow or to mature the policy at age 100. The fourth metric that factors into the product value for money scoring driver is an index of product flexibility. The index of product flexibility consists of one point for each of the following features: no-lapse guarantees, term riders, penalty-free withdrawals, preferred loans, refunds of cost-of-insurance (COI) charges, and persistency bonuses.

The next scoring driver, for the embodiment for universal life insurance, product stress tolerance, incorporates three metrics. The first metric is the ratio of the 20-year cash surrender value on mid-point assumptions (halfway between current assumptions and guaranteed assumptions) to the 20-year cash surrender value on current assumptions. Thus, the first metric measures the percentage drop in policy values if interest rates and mortality deteriorate. The second metric used in assessing product stress tolerance is the number of years the policy stays in force at the mid-point assumptions. This second metric measures the adequacy of the planned premium if interest rates and mortality both deteriorate from what was expected. Finally, the system calculates the IRR just as for the product value for money scoring driver, but with premiums cut in half after the third year. This third metric measures the drop in product performance should the policyholder reduce premium payments.

In the embodiment for universal life insurance products, Management Performance is measured using the following analytical metrics: (1) Five-year average Return on Equity (ROE); (2) ratio of ordinary life expenses to Generally Recognized Expense Table expenses (GRET); (3) five-year average of annual premium growth rate in excess of annual expense growth rate (PEGG); (4) five-year asset compound annual growth rate; (5) maximum earnings deviation from geometric path; (6) ratio of ordinary life expenses to ordinary life premiums; and (7) ratio of ordinary life expenses to ordinary life reserves. Information to support these metrics may be derived from a carrier's annual statutory statements, or if the company is a subsidiary of a larger life insurer, data is taken from the consolidated statutory statement for total U.S. operations for the larger insurer.

(1) The ROE for each year is net income divided by average of beginning and ending capital & surplus for the carrier.

(2) Generally Recognized Expense Tables (GRET) are calculated as follows (based on the 1998 Society of Actuaries factors): $65 per policy for new business, plus $33 per policy already issued, plus $1.25 per unit for new business, plus 72% of new business premiums.

(3) Five-year Average Premium Growth Rate in excess of Expense Growth Rate (PEGG) is the average annual difference between the ordinary life premium growth rate and the ordinary life expense growth rate.

(4) Five-year Assets CAGR is the compound annualized growth rate for the Assets over the last 5 years.

(5) Maximum earnings deviation from geometric path is the maximum absolute difference between the net income in each of the previous 5 years and the theoretical net income, if net income had grown at exactly the 5-year net income CAGR, divided by theoretical net income.

(6) & (7) Ordinary Life Expense is equal to line 22 (General Insurance Expenses), column 3 (Life Insurance) in the Analysis of Operations by Lines of Business. Ordinary Life Premium is the sum of lines 1 & 1A (Premiums and Deposit-type funds), column 3, in the Analysis of Operations by Lines of Business. Reserves are the ordinary life reserves gross of reinsurance (Exhibit 8A) in the annual statement.

The fourth scoring driver for the embodiment for universal life insurance products, historical credited rates, is a measure of the composite effects of historical rates. As a measure of the composite effect of historical rates, this scoring driver calculates the value of $1,000 at the beginning of each year accumulated at the historical credited rates for five years.

The fifth scoring driver for the embodiment for universal life insurance products, company service quality, is based on appropriate industry-sponsored surveys of carrier practices. One such survey is conducted by the Life Office Management Association (LOMA), an insurance trade association based in Atlanta, Ga. If this survey were to be used as the basis for this scoring driver, four metrics would emerge. The first metric is number of days between application and the offer of insurance. This metric captures one of the most often cited sources of customer satisfaction or dissatisfaction when applying first for a policy. The second metric is telephone service, which is based on a composite score of the following: (1) days per week that customer service is available; (2) average number of calls per customer service representative per day; (3) number of hours a day that customer service is available; and (4) availability of 800 numbers. The third metric is an index of Internet service, consisting of one point for each of the following features: (1) availability of a web page for the carrier; (2) availability of specific product information on the web page; (3) online quotation availability; (4) online application capability; (5) access to customer account information and policy values; (6) capability to change customer information online (address, beneficiary, etc.); and (7) application status tracking capability. The fourth metric is the number of days to complete standard service functions. This fourth metric is the average of the days to complete each of the following: (1) process a cash loan request; (2) process a cash surrender request; (3) pay an uncontested death claim; and (4) reply to customer correspondence.

The final scoring driver for the embodiment for universal life insurance products is A.M. Best's Ratings, which represent the opinion of one rating agency, A. M. Best Company, as to the insurer's financial strength and ability to meet ongoing obligations to policyholders.

The product value rating, the individual driver numeric scores, and the scores for all the metrics are all converted to a "normalized" scale between 0 and 5. The higher the score, the better the product value. The product value rating is the weighted average of the six driver scores. For scoring drivers based on more than one metric, the driver score is the weighted average of the scores for each metric.

The weights reflect the relative importance of each of the scoring drivers in evaluating life insurance and annuity products. The weights for each driver, and for each metric within the drivers, are shown in Table A for the embodiment for universal life insurance products.

TABLE A

Weighting Summary

| | | | Driver Metric | |
|---|---|---|---|---|
| I. | Product Value for Money | | 40% | |
| | | IRR - current assumptions, LIMRA lapses | | 32.5% |
| | | IRR - current assumptions, level lapses | | 32.5% |
| | | Planned Premium to Achieve Objective | | 25% |
| | | Product Flexibility | | 10% |
| | | | | 100% |
| II. | Product Stress Tolerance | | 20% | |
| | | Ratio of 20-year CSV for midpoint: current assumptions | | 60% |
| | | Years in force at midpoint assumptions | | 20% |
| | | IRR - current assumptions with 50% premium years 4+ | | 20% |
| | | | | 100% |
| III. | Management Performance | | 20% | |
| | | 5-year Average ROE | | 40% |
| | | Actual Ordinary Life Expenses/Generally Recognized Expense Table | | 20% |
| | | 5-year Average PEGG | | 10% |
| | | 5-year Assets CAGR | | 10% |
| | | Maximum Earnings Deviation from Geometric Path | | 10% |
| | | Ordinary Life Expenses/Ordinary Life Premium | | 5% |
| | | Ordinary Life Expenses/Ordinary Life Reserves | | 5% |
| | | | | 100% |
| IV. | Historical Credited Rates | | 10% | |
| V. | Company Service Quality | | 5% | |
| | | Average time to offer | | 60% |
| | | Telephone service | | 15% |
| | | Website capabilities | | 15% |
| | | Response time for standard requests | | 10% |
| | | | | 100% |
| VI. | Best's Rating | | 5% | |
| | Total Weight of Drivers: | | 100% | |

For each metric within a scoring driver, a high point and a low point are set. If that metric for any product exceeds the high point, that product's normalized score is set to 5. If the metric is below the low point, the normalized score is set to 0; if it lies between the high and low points, the normalized score is set by linear interpolation.

For Best's ratings, the normalizing methodology is approximated by tabulating 407 companies according to Best's ratings. A++ rated companies' normalized scores are set to 5. A+ rated companies are in the 88th percentile, so their normalized scores are set at 4.4 (88% of 5). A rated companies are in the 53rd percentile, so their normalized scores are set at 2.6, etc. Companies with a rating below B+ have their normalized scores set to 0. Companies on review for upgrade or downgrade may be adjusted halfway up or down to the next normalized score.

Thus, the product value appraisal system 112 simultaneously solicits, prices, and rates, life insurance policy and annuity proposals from insurance carriers. Soliciting, rating and pricing life insurance and annuity policy proposals are conducted in an iterative process. This process is conducted in real-time and preferably continues until optimal product pricing and product ratings have been obtained.

The product value appraisal system 112 continues to provide feedback to the insurance carriers, including rating information and whether the carrier's current bid or proposal meets the customer's minimum requirements. The insurance carrier can then provide a new bid or proposal, taking into consideration the feedback from the product value appraisal system 112. If the insurance carrier believes that its proposal is final, e.g., that it cannot submit a more competitive bid, it provides a final bid or proposal to the product value appraisal system 112.

Insurance carriers transmit their final product proposals to the product value appraisal system 112, as illustrated by step 5 of FIG. 1. Proposals received from insurance carriers must meet or exceed minimum product ratings established at the outset by the product value appraisal system 112. The ratings reflect the product proposal's total value proposition to the proposed insured. The total value proposition of a life insurance or annuity product proposal takes into account, among others, the proposed insured's risk profile together with such detailed information as the insurance product proposal, information on the insurer's financial strength, and information on current market prices.

The product value appraisal system 112 transmits or outputs rated product proposals to the distribution channel, as illustrated by step 6 of FIG. 1. This output includes an appraisal of the entire value proposition for the proposed insured. The appraisal takes such form as a numerical index, an alphabetic grade, or a descriptive phrase such as "superior," "above average," "average," "below-average," or "unacceptable." These results are communicated to the proposed insured by the distribution channel, as illustrated by step 7 of FIG. 1. Appropriate explanatory comments may accompany this information.

Next, the proposed insured makes a purchase decision and communicates that decision to the distribution channel, as illustrated by step 8 of FIG. 1. The proposed insured's purchase decision flows back to the insurance carriers via the distribution channel and the product value appraisal system, as illustrated by steps 9 and 10 of FIG. 1.

FIG. 2 illustrates a more detailed view of the parties involved in the valuation system. Insurance carriers 216 (Ins. Co. A, B, C, D, E, F, . . . ) represent competing insurance carriers available to propose insurance products to meet customer requirements according to the present invention. The product value appraisal system 212 for soliciting, pricing, and rating life insurance and annuity product proposals in a real-time, iterative process is shown. The product value appraisal system 212 way also rate the performance of in-force life insurance policies and annuities and measures the value proposition of replacing in-force insurance policies and annuities. Distribution channels 208 include, among others, aggregators, banks, non-bank institutions, bank trusts, insurance agents, brokers, financial planners and advisors, funeral homes, place of employment, affinity groups and other carriers.

In addition, another embodiment of the present invention provides a method of valuing in-force life insurance and annuity policies and rates the continuing value proposition to the policyholder. As shown in FIG. 3, the product value appraisal system 312 collects, processes and uses available information on the insurance policyholder, the in-force policy, and the insurance company that issued the in-force policy to rate the performance of the in-force policy.

Further, if requested by the policyholder, the product value appraisal system 312 determines the value proposition involved in replacing the in-force policy. If a valuation of a replacement policy is requested, the process proceeds in a manner similar to that process described with regard to FIG. 1. For example, the product value appraisal system 312 solicits, auctions and rates replacement life insurance and annuity policy proposals to compare their value proposition to that of the in-force policy. Second, the product value appraisal system 312 calculates whether replacing the in-force policy would create value for the policyholder, particularly in view of the existing in-force policy.

As shown in FIG. 4, it is possible for an entity including a consumer seeking a life insurance or annuity product to invoke the product value appraisal system 412 without the aid of a distribution channel. As shown in step 1 of FIG. 4, a party seeking such a product, the proposed insured, 404 contacts the product value appraisal system 412, typically via a website interface. The proposed insured 404 provides to the product value appraisal system 412 information necessary to request proposals for life insurance or annuity products. This information provided by the proposed insured includes demographic information and information for developing a risk profile of the proposed insured 404 for the product to be evaluated. Demographic and risk profile data may include, for example, the proposed insured's age, sex, smoking habits amount of insurance desired, the pattern of premium payments and the pattern of disbursements desired from the product. A knowledgeable proposed insured may also provide information about the insurance policy sought, including the proposed premiums to be paid and the proposed benefits to be provided. The proposed insured may also include information as to preferred carriers.

Then, the product value appraisal system 412 initiates bidding and/or invites proposals from interested product providers or carriers 416 by sending a proposed opening bid or invitation for proposal to participating insurance carriers 416, as illustrated by step 2 of FIG. 4. The opening bid provided by the product value appraisal system 412 may include an opening price with a minimum product rating.

After initiating bidding or inviting proposals, the product appraisal system 412 proceeds in an on-line, real-time, iterative process with the insurance carriers 416, as illustrated by step 3 of FIG. 4. Upon receipt of a bid or proposal from a participating insurance carrier 416, the product value appraisal system 412 reviews each bid or proposal and rates the bid or proposal and the pricing of each bid or proposal.

With each product proposal, the carrier 416 will transmit information about the price and benefits of its product along with identifying information about itself. This data includes data about the product's proposed benefits and price on both a guaranteed and illustrated basis, and information about the insurance company proposing the product. Product data include the proposed premiums to be paid and the proposed benefits to be provided, both distinguished between guaranteed amounts and illustrated amounts that depend on assumptions about the future. The insurance company information includes data that quantifies the financial strength of the insurance company. The product value appraisal system 412 will use appropriate actuarial assumptions, such as mortality information specific to the end customer's risk profile, and traditional actuarial present value methodology to determine a numeric rating of the benefits offered in light of the proposed price (Product Value For Money in FIG. 1). Numeric ratings will also be assigned to the product's performance under less optimistic assumptions about future interest rates and at lower premium levels (Product Stress Tolerance), various company financial information (Management Performance), previous interest rates actually credited to the product's values (Historical Credited Rates), various qualitative measures of customer service (Customer Service Quality) and to the financial strength of the product provider (e.g., A.M. Best Rating). These ratings will then be weighted to arrive at an overall rating of the customer value proposition. Details of these six scoring drivers and the formulas for the product value appraisal system are as described above for the embodiment for universal life insurance.

Thus, the product value appraisal system 412 simultaneously solicits, prices, and rates, life insurance and annuity policy proposals from insurance carriers 416. Soliciting, rating and pricing these life insurance and annuity policy proposals are conducted in an iterative process. This process is preferably conducted in real-time and continues until optimal product pricing and product ratings have been obtained. Although each insurance carrier can make one proposal at a time, multiple proposals can also be made by each carrier to generate multiple ratings with multiple prices.

The product value appraisal system 412 continues to provide feedback to the insurance carriers 416, including rating information and whether the carrier's current bid or proposal meets the customer's minimum requirements. The insurance carrier can then provide a new bid or proposal, taking into consideration the feedback from the product value appraisal system 412. If the insurance carrier believes that its proposal is final, e.g., that it cannot submit a more competitive bid, it provides a final bid or proposal to the product value appraisal system 412.

Insurance carriers 416 transmit their final product proposals to the product value appraisal system, as illustrated by step 4 of FIG. 4. Proposals received from insurance carriers 416 must meet or exceed minimum product ratings established at the outset by the product value appraisal system 412. The ratings reflect the insurance or annuity product proposal's total value proposition to the proposed insured 404. The total value proposition of a life insurance or annuity product proposal takes into account the proposed insured's risk profile together with detailed information about the life insurance or annuity product proposal, information on the insurer's financial strength, and information on current market prices.

The product value appraisal system 412 transmits rated product proposals to the proposed insured, as illustrated by step 5 of FIG. 4. This output includes an appraisal of the entire value proposition for the proposed insured 404. The appraisal takes such form as a numerical index, an alphabetic grade, or a descriptive phrase such as "superior," "above average," "average," "below-average," or "unacceptable." Appropriate explanatory comments may accompany this information.

Next, the proposed insured 404 may make a purchase decision and communicate that decision to the product value appraisal system 412, as illustrated by step 6 of FIG. 4. The proposed insured's purchase decision flows back to the insurance carriers 416 via the product value appraisal system 412, as illustrated by step 7 of FIG. 4.

FIG. 5 illustrates an embodiment of the invention appraising the value proposition for replacing an in-force policy. As shown in FIG. 5, it is possible for the holder of an existing policy to query the policy appraisal system or product value appraisal system 512 to appraise the value of the in-force policy and also appraise the value proposition for replacing the in-force policy. As shown in FIG. 5, step 1, the policyholder 504 contacts a distribution channel 508 to assist in obtaining such appraisal. The distribution channel then contacts the product value appraisal system 512, as shown in step 2.

The product value appraisal system 512 then collects, processes and uses available information on the insurance policyholder, the in-force policy, and the insurance company that issued the in-force policy to rate the performance of the in-force policy. The product value appraisal system 512 uses appropriate actuarial assumptions, such as mortality information specific to the end customer's risk profile, and traditional actuarial present value methodology to determine a numeric rating of the benefits offered in light of the price (Product Value For Money in FIG. 1). Numeric ratings will also be assigned to the product's performance under less optimistic assumptions about future interest rates and at lower premium levels (Product Stress Tolerance), various company financial information (Management Performance), previous interest rates actually credited to the product's values (Historical Credited Rates), various qualitative measures of customer service (Customer Service Quality) and to the financial strength of the product provider (e.g., A.M. Best Rating). These ratings will then be weighted to arrive at an overall rating of the customer value proposition. Details of these six scoring drivers and the formulas for the product value appraisal system are as described above for the embodiment for universal life insurance products. Information regarding the rating and value proposition are transmitted to the policyholder 504 via the distribution channel 508.

The product value appraisal system 512 also conducts a similar appraisal for a proposed replacement policy. If requested by the policyholder 504 via the distribution channel or by the distribution channel 508, the product value appraisal system 512 can solicit life insurance and annuity policy proposals from insurance carriers in the iterative processed described with regard to FIG. 1. Similarly, the policyholder 504 may provide information regarding the replacement policy under consideration to the product value appraisal system via the distribution channel 508, as illustrated by steps 5 and 6.

Although FIG. 5 illustrates a policyholder invoking the product value appraisal system via a distribution channel, it is possible for the policyholder to contact the product value appraisal system directly to conduct an analysis of an in-force policy and appraisal of the value proposition for replacing the in-force policy.

Figure 6:
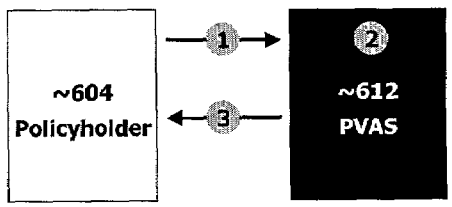
FIG. 6 is a block diagram that illustrates an embodiment of the present invention for a policyholder to query a product value appraisal system for rating an in-force life insurance policy or annuity.

As shown in FIG. 6, it is possible for the holder of an existing policy to query the product value appraisal system to value the in-force policy without the aid of a distribution channel. As shown in FIG. 6, the policyholder 604 contacts the product value appraisal system 612, for example, via a website. The product value appraisal system 612 then collects, processes and uses available information on the insurance policyholder, the in-force policy, and the insurance company that issued the in-force policy to rate the performance of the in-force policy.

Further, if requested by the policyholder, the product value appraisal system 512 determines the value proposition involved in replacing the in-force policy. If a valuation of a replacement policy is requested, the process proceeds in a manner similar to that process described with regard to FIG. 4. For example, the valuation system solicits, auctions and rates replacement insurance policy proposals to compare their value proposition to that of the in-force policy. Second, the invention calculates whether replacing the in-force policy would create value for the policyholder, particularly in view of the existing in-force policy.

Revenues for use of the product value appraisal system are generated from subscription fees from life insurance product or annuity providers for participation in the auction process, transaction fees from the providers for the processing of bids and appraising the customer value proposition of proposals submitted, transaction fees from the distribution channel to receive the output from valuation system, and data subscription fees from the product providers to access the market intelligence data that will accumulate over time. Moreover, the valuation system may be provided as value-added services to the distribution channels, or to consumers directly, who pay a fee to use the service.

An example of the valuation system of the present invention is provided. John Consumer is reviewing his estate plan with his personal, fee-based financial advisor. The advisor recommends the purchase of an additional $250,000 of life insurance in an irrevocable trust to replace assets transferred to a Charitable Remainder Trust. Because it is not known when Mr. Consumer will die, a permanent (as opposed to term) form of insurance is recommended. Following some discussions of the various forms of permanent coverage, it is agreed to seek the best available life product to fill the need.

The financial advisor then goes on-line to the web site which places the financial advisor in contact with the product value appraisal system and commences a search for the best value for his client using the value appraisal system. In this example, the distribution channel is the financial advisor. As the distribution channel, the financial advisor, in response to prompts by the web site interface, enters the following information which is transmitted to the product value appraisal system: (1) risk profile data about John Consumer including, inter alia, his present age (45), sex (male), and smoking status (non-smoker); (2) the purpose of the proposed insurance (asset replacement to preserve his estate); (3) the desired pattern of premium payments (for life); (4) the disbursements desired from the policy (none prior to payment of the death benefit); and (5) face amount and type of product for which proposals are desired ($250,000 of life insurance).

The website receives the information and invokes the product value appraisal system, which opens an on-line, real-time proposal solicitation process for interested carriers. These proposals include, inter alia, policy illustrations showing the target premiums, guaranteed and illustrated benefits and cash values at select points in the future, and identifying information about the proposing carrier. Proposals are received from four carriers (A, B, C, and D). The product value appraisal system conducts an overall appraisal of the proposals received.

Product Value for Money

The cash flow was projected for the group of policyholders, using an industry mortality rate for nonsmokers of this policy size, and lapses (a) according to the LIMRA tables, as shown in Table B and (b) 5%, as shown in Tables C1-C4.

TABLE B

Product Value for Money
Mortality and LIMRA Lapse rates per 1,000

| Age | Duration | Mortality Rate | Lapse Rate |
|---|---|---|---|
| 45 | 1 | 0.40 | 59 |
| 46 | 2 | 0.59 | 69 |
| 47 | 3 | 0.78 | 51 |
| 48 | 4 | 0.98 | 65 |
| 49 | 5 | 1.24 | 57 |
| 50 | 6 | 1.60 | 29 |
| 51 | 7 | 2.02 | 42 |
| 52 | 8 | 2.49 | 42 |
| 53 | 9 | 2.94 | 42 |
| 54 | 10 | 3.44 | 42 |
| 55 | 11 | 3.85 | 42 |
| 56 | 12 | 4.46 | 42 |
| 57 | 13 | 5.17 | 42 |
| 58 | 14 | 5.63 | 42 |
| 59 | 15 | 6.18 | 42 |
| 60 | 16 | 7.13 | 42 |
| 61 | 17 | 8.07 | 42 |
| 62 | 18 | 9.10 | 42 |
| 63 | 19 | 10.26 | 42 |
| 64 | 20 | 11.35 | 42 |
| 65 | 21 | 12.53 | 42 |
| 66 | 22 | 13.67 | 42 |
| 67 | 23 | 14.81 | 42 |
| 68 | 24 | 15.85 | 42 |
| 69 | 25 | 16.96 | 42 |
| 70 | 26 | 21.03 | 42 |
| 71 | 27 | 22.98 | 42 |
| 72 | 28 | 25.18 | 42 |
| 73 | 29 | 27.60 | 42 |
| 74 | 30 | 30.27 | 42 |
| 75 | 31 | 33.01 | 42 |
| 76 | 32 | 36.25 | 42 |
| 77 | 33 | 40.15 | 42 |
| 78 | 34 | 44.46 | 42 |
| 79 | 35 | 49.29 | 42 |
| 80 | 36 | 54.43 | 42 |
| 81 | 37 | 59.90 | 42 |
| 82 | 38 | 65.32 | 42 |
| 83 | 39 | 70.91 | 42 |
| 84 | 40 | 77.59 | 42 |
| 85 | 41 | 85.53 | 42 |
| 86 | 42 | 95.14 | 42 |
| 87 | 43 | 105.23 | 42 |
| 88 | 44 | 115.29 | 42 |
| 89 | 45 | 124.98 | 42 |
| 90 | 46 | 134.61 | 42 |
| 91 | 47 | 146.21 | 42 |
| 92 | 48 | 159.13 | 42 |
| 93 | 49 | 175.52 | 42 |

TABLE B-continued

Product Value for Money
Mortality and LIMRA Lapse rates per 1,000

| Age | Duration | Mortality Rate | Lapse Rate |
|---|---|---|---|
| 94 | 50 | 192.61 | 42 |
| 95 | 51 | 207.65 | 42 |
| 96 | 52 | 219.62 | 42 |
| 97 | 53 | 224.00 | 42 |
| 98 | 54 | 230.49 | 42 |
| 99 | 55 | 238.19 | 761.81 |

Note:
Lapse rate at age 99 is to ensure that all policyholders lapse.

In each year, the cash flow is:
Premiums for lives in force at the beginning of the year, less
Expected deaths in the year multiplied by the Face Amount, less
Expected surrenders in the year multiplied by the Cash Surrender Value.

Internal rates of return are then calculated. A commercial software product, such as Microsoft Excel, which has an IRR function, may be used for each product based on the cash flows. Using the LIMRA lapse assumptions, for example, Company D the highest IRR at 6.616%, and Company A has the lowest IRR at 5.073%. The high point is set at 6.5% and the low point at 4.5%. Company D, being above the high point, receives a normalized score of 5. Company A, by interpolation, receives a normalized score of 1.4325, rounded to 1.4. A similar process is used for the flat 5% lapse assumption. The IRR calculations for each of the Companies A, B, C, and D are shown in Tables C1-C4.

TABLE C1

Product Value for Money - Calculation of IRR - LIMRA Lapses
Company A

| Age | Duration | Premium | AV | CSV | DB | Cash Flow | IRR |
|---|---|---|---|---|---|---|---|
| 45 | 1 | 2,125 | 526 | 0 | 250,000 | 2,027.14 | 5.073% |
| 46 | 2 | 2,125 | 2,002 | 0 | 250,000 | 1,864.09 | |
| 47 | 3 | 2,125 | 3,566 | 0 | 250,000 | 1,693.07 | |
| 48 | 4 | 2,125 | 5,223 | 0 | 250,000 | 1,565.67 | |
| 49 | 5 | 2,125 | 6,959 | 567 | 250,000 | 1,388.14 | |
| 50 | 6 | 2,125 | 8,827 | 2,751 | 250,000 | 1,205.97 | |
| 51 | 7 | 2,125 | 10,813 | 5,064 | 250,000 | 1,003.19 | |
| 52 | 8 | 2,125 | 12,894 | 7,483 | 250,000 | 812.31 | |
| 53 | 9 | 2,125 | 15,098 | 10,037 | 250,000 | 635.74 | |
| 54 | 10 | 2,125 | 17,426 | 12,732 | 250,000 | 463.23 | |
| 55 | 11 | 2,125 | 19,850 | 16,396 | 250,000 | 291.96 | |
| 56 | 12 | 2,125 | 22,296 | 19,944 | 250,000 | 111.58 | |
| 57 | 13 | 2,125 | 24,852 | 23,446 | 250,000 | (65.26) | |
| 58 | 14 | 2,125 | 27,524 | 26,908 | 250,000 | (193.46) | |
| 59 | 15 | 2,125 | 30,338 | 30,338 | 250,000 | (319.55) | |
| 60 | 16 | 2,125 | 33,278 | 33,278 | 250,000 | (469.45) | |
| 61 | 17 | 2,125 | 36,352 | 36,352 | 250,000 | (603.74) | |
| 62 | 18 | 2,125 | 39,560 | 39,560 | 250,000 | (734.97) | |
| 63 | 19 | 2,125 | 42,908 | 42,908 | 250,000 | (865.03) | |
| 64 | 20 | 2,125 | 46,398 | 46,398 | 250,000 | (974.62) | |
| 65 | 21 | 2,125 | 50,054 | 50,054 | 250,000 | (1,079.20) | |
| 66 | 22 | 2,125 | 53,858 | 53,858 | 250,000 | (1,167.40) | |
| 67 | 23 | 2,125 | 57,809 | 57,809 | 250,000 | (1,243.07) | |
| 68 | 24 | 2,125 | 61,906 | 61,906 | 250,000 | (1,299.40) | |
| 69 | 25 | 2,125 | 66,140 | 66,140 | 250,000 | (1,350.62) | |
| 70 | 26 | 2,125 | 70,502 | 70,502 | 250,000 | (1,582.22) | |
| 71 | 27 | 2,125 | 74,977 | 74,977 | 250,000 | (1,647.34) | |
| 72 | 28 | 2,125 | 79,545 | 79,545 | 250,000 | (1,708.99) | |
| 73 | 29 | 2,125 | 84,179 | 84,179 | 250,000 | (1,763.59) | |

TABLE C1-continued

Product Value for Money - Calculation of IRR - LIMRA Lapses Company A

| Age | Duration | Premium | AV | CSV | DB | Cash Flow | IRR |
|---|---|---|---|---|---|---|---|
| 74 | 30 | 2,125 | 88,573 | 88,573 | 250,000 | (1,808.46) | |
| 75 | 31 | 2,125 | 93,055 | 93,055 | 250,000 | (1,837.56) | |
| 76 | 32 | 2,125 | 97,548 | 97,548 | 250,000 | (1,868.36) | |
| 77 | 33 | 2,125 | 102,043 | 102,043 | 250,000 | (1,902.89) | |
| 78 | 34 | 2,125 | 106,540 | 16,540 | 250,000 | (1,384.83) | |
| 79 | 35 | 2,125 | 111,037 | 111,037 | 250,000 | (1,942.39) | |
| 80 | 36 | 2,125 | 115,538 | 115,538 | 250,000 | (1,939.12) | |
| 81 | 37 | 2,125 | 120,047 | 120,047 | 250,000 | (1,918.18) | |
| 82 | 38 | 2,125 | 124,572 | 124,572 | 250,000 | (1,870.75) | |
| 83 | 39 | 2,125 | 129,126 | 129,126 | 250,000 | (1,805.84) | |
| 84 | 40 | 2,125 | 133,719 | 133,719 | 250,000 | (1,742.95) | |
| 85 | 41 | 2,125 | 138,369 | 138,369 | 250,000 | (1,679.76) | |
| 86 | 42 | 2,125 | 143,094 | 143,094 | 250,000 | (1,616.67) | |
| 87 | 43 | 2,125 | 147,917 | 147,917 | 250,000 | (1,531.49) | |
| 88 | 44 | 2,125 | 152,871 | 152,871 | 250,000 | (1,422.26) | |
| 89 | 45 | 2,125 | 158,001 | 158,001 | 250,000 | (1,293.41) | |
| 90 | 46 | 2,125 | 163,372 | 163,372 | 250,000 | (1,156.21) | |
| 91 | 47 | 2,125 | 169,070 | 169,070 | 250,000 | (1,029.28) | |
| 92 | 48 | 2,125 | 175,208 | 175,208 | 250,000 | (905.19) | |
| 93 | 49 | 2,125 | 181,934 | 181,934 | 250,000 | (792.92) | |
| 94 | 50 | 2,125 | 188,913 | 188,913 | 250,000 | (677.31) | |
| 95 | 51 | 2,125 | 197,239 | 197,239 | 250,000 | (557.51) | |
| 96 | 52 | 2,125 | 207,171 | 207,171 | 250,000 | (442.56) | |
| 97 | 53 | 2,125 | 219,020 | 219,020 | 250,000 | (335.01) | |
| 98 | 54 | 2,125 | 233,154 | 233,154 | 250,000 | (254.31) | |
| 99 | 55 | 2,125 | 250,016 | 250,016 | 250,016 | (595.21) | |

TABLE C2

Product Value for Money - Calculation of IRR - LIMRA Lapses Company B

| Age | Duration | Premium | AV | CSV | DB | Cash Flow | IRR |
|---|---|---|---|---|---|---|---|
| 45 | 1 | 1,953 | 909 | 0 | 250,000 | 1,855.14 | 6.185% |
| 46 | 2 | 1,953 | 2,409 | 0 | 250,000 | 1,702.31 | |
| 47 | 3 | 1,953 | 3,972 | 0 | 250,000 | 1,542.54 | |
| 48 | 4 | 1,953 | 5,638 | 663 | 250,000 | 1,387.20 | |
| 49 | 5 | 1,953 | 7,434 | 2,911 | 250,000 | 1,151.34 | |
| 50 | 6 | 1,953 | 9,465 | 5,394 | 250,000 | 1,024.52 | |
| 51 | 7 | 1,953 | 11,611 | 7,992 | 250,000 | 794.56 | |
| 52 | 8 | 1,953 | 13,879 | 10,713 | 250,000 | 604.31 | |
| 53 | 9 | 1,953 | 16,275 | 13,561 | 250,000 | 429.05 | |
| 54 | 10 | 1,953 | 18,803 | 16,541 | 250,000 | 258.47 | |
| 55 | 11 | 1,953 | 21,446 | 19,637 | 250,000 | 110.56 | |
| 56 | 12 | 1,953 | 24,203 | 22,847 | 250,000 | (53.52) | |
| 57 | 13 | 1,953 | 27,068 | 26,164 | 250,000 | (218.51) | |
| 58 | 14 | 1,953 | 30,045 | 29,593 | 250,000 | (338.77) | |
| 59 | 15 | 1,953 | 33,139 | 33,139 | 250,000 | (460.29) | |
| 60 | 16 | 1,953 | 36,357 | 36,537 | 250,000 | (612.25) | |
| 61 | 17 | 1,953 | 39,699 | 39,699 | 250,000 | (741.12) | |
| 62 | 18 | 1,953 | 43,164 | 43,164 | 250,000 | (869.93) | |
| 63 | 19 | 1,953 | 46,756 | 46,756 | 250,000 | (997.11) | |
| 64 | 20 | 1,953 | 50,474 | 50,474 | 250,000 | (1,103.34) | |
| 65 | 21 | 1,953 | 54,284 | 54,284 | 250,000 | (1,203.31) | |
| 66 | 22 | 1,953 | 58,225 | 58,225 | 250,000 | (1,286.63) | |
| 67 | 23 | 1,953 | 62,293 | 62,293 | 250,000 | (1,357.18) | |
| 68 | 24 | 1,953 | 66,487 | 66,487 | 250,000 | (1,408.21) | |
| 69 | 25 | 1,953 | 70,804 | 70,804 | 250,000 | (1,454.08) | |
| 70 | 26 | 1,953 | 75,241 | 75,241 | 250,000 | (1,680.31) | |
| 71 | 27 | 1,953 | 79,781 | 79,781 | 250,000 | (1,739.86) | |
| 72 | 28 | 1,953 | 84,421 | 84,421 | 250,000 | (1,796.15) | |
| 73 | 29 | 1,953 | 89,158 | 89,158 | 250,000 | (1,845.76) | |
| 74 | 30 | 1,953 | 93,985 | 93,985 | 250,000 | (1,888.48) | |
| 75 | 31 | 1,953 | 98,880 | 98,880 | 250,000 | (1,914.94) | |
| 76 | 32 | 1,953 | 103,828 | 103,828 | 250,000 | (1,943.12) | |
| 77 | 33 | 1,953 | 108,814 | 108,814 | 250,000 | (1,974.94) | |

TABLE C2-continued

Product Value for Money - Calculation of IRR - LIMRA Lapses Company B

| Age | Duration | Premium | AV | CSV | DB | Cash Flow | IRR |
|---|---|---|---|---|---|---|---|
| 78 | 34 | 1,953 | 113,823 | 113,823 | 250,000 | (1,996.37) | |
| 79 | 35 | 1,953 | 118,843 | 118,843 | 250,000 | (2,008.32) | |
| 80 | 36 | 1,953 | 123,863 | 123,863 | 250,000 | (2,001.52) | |
| 81 | 37 | 1,953 | 128,878 | 128,878 | 250,000 | (1,976.72) | |
| 82 | 38 | 1,953 | 133,890 | 133,890 | 250,000 | (1,925.18) | |
| 83 | 39 | 1,953 | 138,900 | 138,900 | 250,000 | (1,855.96) | |
| 84 | 40 | 1,953 | 143,895 | 143,895 | 250,000 | (1,788.58) | |
| 85 | 41 | 1,953 | 148,866 | 148,866 | 250,000 | (1,720.70) | |
| 86 | 42 | 1,953 | 153,818 | 153,818 | 250,000 | (1,652.81) | |
| 87 | 43 | 1,953 | 158,755 | 158,755 | 250,000 | (1,562.79) | |
| 88 | 44 | 1,953 | 163,689 | 163,689 | 250,000 | (1,448.82) | |
| 89 | 45 | 1,953 | 168,654 | 168,654 | 250,000 | (1,315.47) | |
| 90 | 46 | 1,953 | 173,705 | 173,705 | 250,000 | (1,174.12) | |
| 91 | 47 | 1,953 | 178,990 | 178,990 | 250,000 | (1,043.56) | |
| 92 | 48 | 1,953 | 184,626 | 184,626 | 250,000 | (916.32) | |
| 93 | 49 | 1,953 | 190,769 | 190,769 | 250,000 | (801.38) | |
| 94 | 50 | 1,953 | 197,629 | 197,629 | 250,000 | (683.83) | |
| 95 | 51 | 1,953 | 204,973 | 204,973 | 250,000 | (562.11) | |
| 96 | 52 | 1,953 | 213,158 | 213,158 | 250,000 | (445.51) | |
| 97 | 53 | 1,953 | 222,747 | 222,747 | 250,000 | (336.72) | |
| 98 | 54 | 1,953 | 234,628 | 234,628 | 250,000 | (255.23) | |
| 99 | 55 | 1,953 | 250,248 | 250,248 | 250,048 | (596.19) | |

TABLE C3

Product Value for Money - Calculation of IRR - LIMRA Lapses Company C

| Age | Duration | Premium | AV | CSV | DB | Cash Flow | IRR |
|---|---|---|---|---|---|---|---|
| 45 | 1 | 2,048 | 1,044 | 0 | 250,000 | 1,950.14 | 5.182% |
| 46 | 2 | 2,048 | 2,589 | 0 | 250,000 | 1,791.66 | |
| 47 | 3 | 2,048 | 4,174 | 0 | 250,000 | 1,625.68 | |
| 48 | 4 | 2,048 | 5,823 | 0 | 250,000 | 1,501.78 | |
| 49 | 5 | 2,048 | 7,551 | 1,227 | 250,000 | 1,299.32 | |
| 50 | 6 | 2,048 | 9,369 | 3,045 | 250,000 | 1,143.55 | |
| 51 | 7 | 2,048 | 11,288 | 4,963 | 250,000 | 951.70 | |
| 52 | 8 | 2,048 | 13,313 | 6,988 | 250,000 | 774.27 | |
| 53 | 9 | 2,048 | 15,446 | 9,122 | 250,000 | 610.78 | |
| 54 | 10 | 2,048 | 17,688 | 11,364 | 250,000 | 451.10 | |
| 55 | 11 | 2,048 | 20,031 | 14,339 | 250,000 | 297.40 | |
| 56 | 12 | 2,048 | 22,451 | 17,391 | 250,000 | 128.44 | |
| 57 | 13 | 2,048 | 24,934 | 20,507 | 250,000 | (40.53) | |
| 58 | 14 | 2,048 | 27,484 | 23,689 | 250,000 | (163.93) | |
| 59 | 15 | 2,048 | 30,102 | 26,939 | 250,000 | (287.78) | |
| 60 | 16 | 2,048 | 32,752 | 30,222 | 250,000 | (445.88) | |
| 61 | 17 | 2,048 | 35,494 | 33,596 | 250,000 | (586.89) | |
| 62 | 18 | 2,048 | 38,330 | 37,065 | 250,000 | (723.54) | |
| 63 | 19 | 2,048 | 41,265 | 40,633 | 250,000 | (857.86) | |
| 64 | 20 | 2,048 | 44,303 | 44,303 | 250,000 | (970.67) | |
| 65 | 21 | 2,048 | 47,421 | 47,421 | 250,000 | (1,067.49) | |
| 66 | 22 | 2,048 | 50,616 | 50,616 | 250,000 | (1,147.79) | |
| 67 | 23 | 2,048 | 53,904 | 53,904 | 250,000 | (1,215.79) | |
| 68 | 24 | 2,048 | 57,293 | 57,293 | 250,000 | (1,264.85) | |
| 69 | 25 | 2,048 | 60,782 | 60,782 | 250,000 | (1,309.34) | |
| 70 | 26 | 2,048 | 64,369 | 64,369 | 250,000 | (1,534.93) | |
| 71 | 27 | 2,048 | 68,055 | 68,055 | 250,000 | (1,594.93) | |
| 72 | 28 | 2,048 | 71,843 | 71,843 | 250,000 | (1,652.53) | |
| 73 | 29 | 2,048 | 75,734 | 75,734 | 250,000 | (1,704.32) | |
| 74 | 30 | 2,048 | 79,724 | 79,724 | 250,000 | (1,750.03) | |
| 75 | 31 | 2,048 | 83,809 | 83,809 | 250,000 | (1,780.38) | |
| 76 | 32 | 2,048 | 87,983 | 87,983 | 250,000 | (1,813.30) | |
| 77 | 33 | 2,048 | 92,240 | 92,240 | 250,000 | (1,850.69) | |
| 78 | 34 | 2,048 | 96,575 | 96,575 | 250,000 | (1,878.47) | |
| 79 | 35 | 2,048 | 100,987 | 100,987 | 250,000 | (1,897.52) | |
| 80 | 36 | 2,048 | 105,476 | 105,476 | 250,000 | (1,898.42) | |
| 81 | 37 | 2,048 | 110,047 | 110,047 | 250,000 | (1,881.81) | |

TABLE C3-continued

Product Value for Money - Calculation of IRR - LIMRA Lapses Company C

| Age | Duration | Premium | AV | CSV | DB | Cash Flow | IRR |
|---|---|---|---|---|---|---|---|
| 82 | 38 | 2,048 | 114,711 | 114,711 | 250,000 | (1,838.75) | |
| 83 | 39 | 2,048 | 119,482 | 119,482 | 250,000 | (1,778.16) | |
| 84 | 40 | 2,048 | 124,363 | 124,363 | 250,000 | (1,719.41) | |
| 85 | 41 | 2,048 | 129,360 | 129,360 | 250,000 | (1,660.10) | |
| 86 | 42 | 2,048 | 134,488 | 134,488 | 250,000 | (1,600.60) | |
| 87 | 43 | 2,048 | 139,768 | 139,768 | 250,000 | (1,518.66) | |
| 88 | 44 | 2,048 | 145,231 | 145,231 | 250,000 | (1,412.29) | |
| 89 | 45 | 2,048 | 150,929 | 150,929 | 250,000 | (1,285.90) | |
| 90 | 46 | 2,048 | 156,935 | 156,935 | 250,000 | (1,150.76) | |
| 91 | 47 | 2,048 | 163,342 | 163,342 | 250,000 | (1,025.55) | |
| 92 | 48 | 2,048 | 170,263 | 170,263 | 250,000 | (902.82) | |
| 93 | 49 | 2,048 | 177,843 | 177,843 | 250,000 | (791.59) | |
| 94 | 50 | 2,048 | 186,264 | 186,264 | 250,000 | (677.00) | |
| 95 | 51 | 2,048 | 195,758 | 195,758 | 250,000 | (557.72) | |
| 96 | 52 | 2,048 | 206,617 | 206,617 | 250,000 | (442.98) | |
| 97 | 53 | 2,048 | 219,221 | 219,221 | 250,000 | (335.47) | |
| 98 | 54 | 2,048 | 234,056 | 234,056 | 250,000 | (254.76) | |
| 99 | 55 | 2,048 | 251,745 | 251,745 | 251,745 | (599.60) | |

TABLE C4

Product Value for Money - Calculation of IRR - LIMRA Lapses Company D

| Age | Duration | Premium | AV | CSV | DB | Cash Flow | IRR |
|---|---|---|---|---|---|---|---|
| 45 | 1 | 1,648 | 1,387 | — | 250,000 | 1,550.14 | 6.616% |
| 46 | 2 | 1,648 | 2,800 | — | 250,000 | 1,415.43 | |
| 47 | 3 | 1,648 | 4,242 | — | 250,000 | 1,275.62 | |
| 48 | 4 | 1,648 | 5,717 | — | 250,000 | 1,169.85 | |
| 49 | 5 | 1,648 | 7,255 | 523 | 250,000 | 1,020.37 | |
| 50 | 6 | 1,648 | 8,833 | 2,435 | 250,000 | 864.48 | |
| 51 | 7 | 1,648 | 10,482 | 4,430 | 250,000 | 684.49 | |
| 52 | 8 | 1,648 | 12,180 | 6,487 | 250,000 | 517.91 | |
| 53 | 9 | 1,648 | 13,929 | 8,609 | 250,000 | 366.15 | |
| 54 | 10 | 1,648 | 15,705 | 10,772 | 250,000 | 219.51 | |
| 55 | 11 | 1,648 | 17,453 | 12,923 | 250,000 | 96.68 | |
| 56 | 12 | 1,648 | 19,174 | 15,062 | 250,000 | (41.58) | |
| 57 | 13 | 1,648 | 21,011 | 17,333 | 250,000 | (183.69) | |
| 58 | 14 | 1,648 | 22,969 | 19,744 | 250,000 | (283.86) | |
| 59 | 15 | 1,648 | 25,058 | 22,308 | 250,000 | (388.04) | |
| 60 | 16 | 1,648 | 27,287 | 25,032 | 250,000 | (530.53) | |
| 61 | 17 | 1,648 | 29,664 | 27,932 | 250,000 | (658.69) | |
| 62 | 18 | 1,648 | 32,200 | 31,012 | 250,000 | (785.00) | |
| 63 | 19 | 1,648 | 34,905 | 34,295 | 250,000 | (911.51) | |
| 64 | 20 | 1,648 | 37,790 | 37,790 | 250,000 | (1,018.82) | |
| 65 | 21 | 1,648 | 40,816 | 40,816 | 250,000 | (1,111.76) | |
| 66 | 22 | 1,648 | 43,943 | 43,943 | 250,000 | (1,188.75) | |
| 67 | 23 | 1,648 | 47,230 | 47,230 | 250,000 | (1,254.51) | |
| 68 | 24 | 1,648 | 50,616 | 50,616 | 250,000 | (1,301.37) | |
| 69 | 25 | 1,648 | 54,111 | 54,111 | 250,000 | (1,343.86) | |
| 70 | 26 | 1,648 | 57,657 | 57,657 | 250,000 | (1,567.12) | |
| 71 | 27 | 1,648 | 61,286 | 61,286 | 250,000 | (1,624.57) | |
| 72 | 28 | 1,648 | 65,034 | 65,034 | 250,000 | (1,679.92) | |
| 73 | 29 | 1,648 | 68,893 | 68,893 | 250,000 | (1,729.66) | |
| 74 | 30 | 1,648 | 72,878 | 72,878 | 250,000 | (1,773.65) | |
| 75 | 31 | 1,648 | 76,961 | 76,961 | 250,000 | (1,802.34) | |
| 76 | 32 | 1,648 | 81,159 | 81,159 | 250,000 | (1,833.87) | |
| 77 | 33 | 1,648 | 85,490 | 85,490 | 250,000 | (1,870.23) | |
| 78 | 34 | 1,648 | 89,913 | 89,913 | 250,000 | (1,897.03) | |
| 79 | 35 | 1,648 | 94,450 | 94,450 | 250,000 | (1,915.25) | |
| 80 | 36 | 1,648 | 99,103 | 99,103 | 250,000 | (1,915.43) | |
| 81 | 37 | 1,648 | 103,843 | 103,843 | 250,000 | (1,898.02) | |
| 82 | 38 | 1,648 | 108,731 | 108,731 | 250,000 | (1,854.28) | |
| 83 | 39 | 1,648 | 113,745 | 113,745 | 250,000 | (1,792.95) | |
| 84 | 40 | 1,648 | 118,901 | 118,901 | 250,000 | (1,733.46) | |
| 85 | 41 | 1,648 | 124,220 | 124,220 | 250,000 | (1,673.43) | |

TABLE C4-continued

Product Value for Money - Calculation of IRR - LIMRA Lapses Company D

| Age | Duration | Premium | AV | CSV | DB | Cash Flow | IRR |
|---|---|---|---|---|---|---|---|
| 86 | 42 | 1,648 | 129,756 | 129,756 | 250,000 | (1,613.27) | |
| 87 | 43 | 1,648 | 135,527 | 135,527 | 250,000 | (1,530.66) | |
| 88 | 44 | 1,648 | 141,585 | 141,585 | 250,000 | (1,423.60) | |
| 89 | 45 | 1,648 | 147,976 | 147,976 | 250,000 | (1,296.48) | |
| 90 | 46 | 1,648 | 154,755 | 154,755 | 250,000 | (1,160.54) | |
| 91 | 47 | 1,648 | 161,991 | 161,991 | 250,000 | (1,034.44) | |
| 92 | 48 | 1,648 | 169,755 | 169,755 | 250,000 | (910.71) | |
| 93 | 49 | 1,648 | 178,135 | 178,135 | 250,000 | (798.41) | |
| 94 | 50 | 1,648 | 187,254 | 187,254 | 250,000 | (682.68) | |
| 95 | 51 | 1,648 | 197,236 | 197,236 | 250,000 | (562.25) | |
| 96 | 52 | 1,648 | 208,253 | 208,253 | 250,000 | (446.42) | |
| 97 | 53 | 1,648 | 220,519 | 220,519 | 250,000 | (337.94) | |
| 98 | 54 | 1,648 | 234,314 | 234,314 | 250,000 | (256.41) | |
| 99 | 55 | 1,648 | 250,002 | 250,002 | 250,002 | (596.58) | |

Calculation of IRR based on a level lapse rate are shown in Tables D1-D4.

TABLE D1

Product Value for Money - Calculation of IRR - Level Lapses Company A

| Age | Duration | Premium | AV | CSV | DB | Cash Flow | IRR |
|---|---|---|---|---|---|---|---|
| 45 | 1 | 2,125 | 526 | 0 | 250,000 | 2,026.69 | 4.806% |
| 46 | 2 | 2,125 | 2,002 | 0 | 250,000 | 1,880.59 | |
| 47 | 3 | 2,125 | 3,566 | 0 | 250,000 | 1,744.08 | |
| 48 | 4 | 2,125 | 5,223 | 0 | 250,000 | 1,613.06 | |
| 49 | 5 | 2,125 | 6,959 | 567 | 250,000 | 1,456.88 | |
| 50 | 6 | 2,125 | 8,827 | 2,751 | 250,000 | 1,231.80 | |
| 51 | 7 | 2,125 | 10,813 | 5,064 | 250,000 | 1,007.95 | |
| 52 | 8 | 2,125 | 12,894 | 7,483 | 250,000 | 792.20 | |
| 53 | 9 | 2,125 | 15,098 | 10,037 | 250,000 | 594.93 | |
| 54 | 10 | 2,125 | 17,426 | 12,732 | 250,000 | 405.41 | |
| 55 | 1 | 2,125 | 19,850 | 16,396 | 250,000 | 216.78 | |
| 56 | 12 | 2,125 | 22,296 | 19,944 | 250,000 | 24.34 | |
| 57 | 13 | 2,125 | 24,852 | 23,446 | 250,000 | (159.84) | |
| 58 | 14 | 2,125 | 27,524 | 26,908 | 250,000 | (292.34) | |
| 59 | 15 | 2,125 | 30,338 | 30,338 | 250,000 | (419.27) | |
| 60 | 16 | 2,125 | 33,278 | 33,278 | 250,000 | (563.88) | |
| 61 | 17 | 2,125 | 36,352 | 36,352 | 250,000 | (690.84) | |
| 62 | 18 | 2,125 | 39,560 | 39,560 | 250,000 | (812.29) | |
| 63 | 19 | 2,125 | 42,908 | 42,908 | 250,000 | (930.11) | |
| 64 | 20 | 2,125 | 46,398 | 46,398 | 250,000 | (1,026.55) | |
| 65 | 21 | 2,125 | 50,054 | 50,054 | 250,000 | (1,116.30) | |
| 66 | 22 | 2,125 | 53,858 | 53,858 | 250,000 | (1,189.14) | |
| 67 | 23 | 2,125 | 57,809 | 57,809 | 250,000 | (1,248.93) | |
| 68 | 24 | 2,125 | 61,906 | 61,906 | 250,000 | (1,289.93) | |
| 69 | 25 | 2,125 | 66,140 | 66,140 | 250,000 | (1,325.16) | |
| 70 | 26 | 2,125 | 70,502 | 70,502 | 250,000 | (1,517.01) | |
| 71 | 27 | 2,125 | 74,977 | 74,977 | 250,000 | (1,560.13) | |
| 72 | 28 | 2,125 | 79,545 | 79,545 | 250,000 | (1,598.79) | |
| 73 | 29 | 2,125 | 84,179 | 84,179 | 250,000 | (1,629.99) | |
| 74 | 30 | 2,125 | 88,573 | 88,573 | 250,000 | (1,651.26) | |
| 75 | 31 | 2,125 | 93,055 | 93,055 | 250,000 | (1,658.30) | |
| 76 | 32 | 2,125 | 97,548 | 97,548 | 250,000 | (1,665.94) | |
| 77 | 33 | 2,125 | 102,043 | 102,043 | 250,000 | (1,675.80) | |
| 78 | 34 | 2,125 | 106,540 | 16,540 | 250,000 | (1,146.61) | |
| 79 | 35 | 2,125 | 111,037 | 111,037 | 250,000 | (1,669.07) | |
| 80 | 36 | 2,125 | 115,538 | 115,538 | 250,000 | (1,646.39) | |
| 81 | 37 | 2,125 | 120,047 | 120,047 | 250,000 | (1,609.52) | |
| 82 | 38 | 2,125 | 124,572 | 124,572 | 250,000 | (1,551.99) | |
| 83 | 39 | 2,125 | 129,126 | 129,126 | 250,000 | (1,481.50) | |
| 84 | 40 | 2,125 | 133,719 | 133,719 | 250,000 | (1,413.59) | |
| 85 | 41 | 2,125 | 138,369 | 138,369 | 250,000 | (1,346.42) | |
| 86 | 42 | 2,125 | 143,094 | 143,094 | 250,000 | (1,280.33) | |
| 87 | 43 | 2,125 | 147,917 | 147,917 | 250,000 | (1,198.61) | |

TABLE D1-continued

Product Value for Money - Calculation of IRR - Level Lapses
Company A

| Age | Duration | Premium | AV | CSV | DB | Cash Flow | IRR |
|---|---|---|---|---|---|---|---|
| 88 | 44 | 2,125 | 152,871 | 152,871 | 250,000 | (1,100.39) | |
| 89 | 45 | 2,125 | 158,001 | 158,001 | 250,000 | (989.56) | |
| 90 | 46 | 2,125 | 163,372 | 163,372 | 250,000 | (874.88) | |
| 91 | 47 | 2,125 | 169,070 | 169,070 | 250,000 | (770.06) | |
| 92 | 48 | 2,125 | 175,208 | 175,208 | 250,000 | (669.52) | |
| 93 | 49 | 2,125 | 181,934 | 181,934 | 250,000 | (579.56) | |
| 94 | 50 | 2,125 | 188,913 | 188,913 | 250,000 | (489.22) | |
| 95 | 51 | 2,125 | 197,239 | 197,239 | 250,000 | (398.10) | |
| 96 | 52 | 2,125 | 207,171 | 207,171 | 250,000 | (312.54) | |
| 97 | 53 | 2,125 | 219,020 | 219,020 | 250,000 | (234.19) | |
| 98 | 54 | 2,125 | 233,154 | 233,154 | 250,000 | (175.96) | |
| 99 | 55 | 2,125 | 250,016 | 250,016 | 250,016 | (398.31) | |

TABLE D2

Product Value for Money - Calculation of IRR - Level Lapses
Company B

| Age | Duration | Premium | AV | CSV | DB | Cash Flow | IRR |
|---|---|---|---|---|---|---|---|
| 45 | 1 | 1,953 | 909 | 0 | 250,000 | 1,854.69 | 6.034% |
| 46 | 2 | 1,953 | 2,409 | 0 | 250,000 | 1,717.26 | |
| 47 | 3 | 1,953 | 3,972 | 0 | 250,000 | 1,589.02 | |
| 48 | 4 | 1,953 | 5,638 | 663 | 250,000 | 1,437.51 | |
| 49 | 5 | 1,953 | 7,434 | 2,911 | 250,000 | 1,222.06 | |
| 50 | 6 | 1,953 | 9,465 | 5,394 | 250,000 | 997.53 | |
| 51 | 7 | 1,953 | 11,611 | 7,992 | 250,000 | 775.38 | |
| 52 | 8 | 1,953 | 13,879 | 10,713 | 250,000 | 561.31 | |
| 53 | 9 | 1,953 | 16,275 | 13,561 | 250,000 | 366.54 | |
| 54 | 10 | 1,953 | 18,803 | 16,541 | 250,000 | 180.30 | |
| 55 | 11 | 1,953 | 21,446 | 19,637 | 250,000 | 20.41 | |
| 56 | 12 | 1,953 | 24,203 | 22,847 | 250,000 | (152.05) | |
| 57 | 13 | 1,953 | 27,068 | 26,164 | 250,000 | (321.74) | |
| 58 | 14 | 1,953 | 30,045 | 29,593 | 250,000 | (444.47) | |
| 59 | 15 | 1,953 | 33,139 | 33,139 | 250,000 | (565.64) | |
| 60 | 16 | 1,953 | 36,357 | 36,537 | 250,000 | (712.11) | |
| 61 | 17 | 1,953 | 39,699 | 39,699 | 250,000 | (832.40) | |
| 62 | 18 | 1,953 | 43,164 | 43,164 | 250,000 | (950.64) | |
| 63 | 19 | 1,953 | 46,756 | 46,756 | 250,000 | (1,064.74) | |
| 64 | 20 | 1,953 | 50,474 | 50,474 | 250,000 | (1,156.97) | |
| 65 | 21 | 1,953 | 54,284 | 54,284 | 250,000 | (1,241.18) | |
| 66 | 22 | 1,953 | 58,225 | 58,225 | 250,000 | (1,308.26) | |
| 67 | 23 | 1,953 | 62,293 | 62,293 | 250,000 | (1,362.10) | |
| 68 | 24 | 1,953 | 66,487 | 66,487 | 250,000 | (1,397.02) | |
| 69 | 25 | 1,953 | 70,804 | 70,804 | 250,000 | (1,426.20) | |
| 70 | 26 | 1,953 | 75,241 | 75,241 | 250,000 | (1,612.04) | |
| 71 | 27 | 1,953 | 79,781 | 79,781 | 250,000 | (1,649.05) | |
| 72 | 28 | 1,953 | 84,421 | 84,421 | 250,000 | (1,681.88) | |
| 73 | 29 | 1,953 | 89,158 | 89,158 | 250,000 | (1,707.74) | |
| 74 | 30 | 1,953 | 93,985 | 93,985 | 250,000 | (1,726.57) | |
| 75 | 31 | 1,953 | 98,880 | 98,880 | 250,000 | (1,730.72) | |
| 76 | 32 | 1,953 | 103,828 | 103,828 | 250,000 | (1,735.51) | |
| 77 | 33 | 1,953 | 108,814 | 108,814 | 250,000 | (1,742.48) | |
| 78 | 34 | 1,953 | 113,823 | 113,823 | 250,000 | (1,740.08) | |
| 79 | 35 | 1,953 | 118,843 | 118,843 | 250,000 | (1,729.34) | |
| 80 | 36 | 1,953 | 123,863 | 123,863 | 250,000 | (1,703.06) | |
| 81 | 37 | 1,953 | 128,878 | 128,878 | 250,000 | (1,662.33) | |
| 82 | 38 | 1,953 | 133,890 | 133,890 | 250,000 | (1,600.74) | |
| 83 | 39 | 1,953 | 138,900 | 138,900 | 250,000 | (1,526.07) | |
| 84 | 40 | 1,953 | 143,895 | 143,895 | 250,000 | (1,453.84) | |
| 85 | 41 | 1,953 | 148,866 | 148,866 | 250,000 | (1,382.25) | |
| 86 | 42 | 1,953 | 153,818 | 153,818 | 250,000 | (1,311.68) | |
| 87 | 43 | 1,953 | 158,755 | 158,755 | 250,000 | (1,225.52) | |
| 88 | 44 | 1,953 | 163,689 | 163,689 | 250,000 | (1,123.00) | |
| 89 | 45 | 1,953 | 168,654 | 168,654 | 250,000 | (1,008.15) | |
| 90 | 46 | 1,953 | 173,705 | 173,705 | 250,000 | (889.81) | |
| 91 | 47 | 1,953 | 178,990 | 178,990 | 250,000 | (781.83) | |

TABLE D2-continued

Product Value for Money - Calculation of IRR - Level Lapses
Company B

| Age | Duration | Premium | AV | CSV | DB | Cash Flow | IRR |
|---|---|---|---|---|---|---|---|
| 92 | 48 | 1,953 | 184,626 | 184,626 | 250,000 | (678.58) | |
| 93 | 49 | 1,953 | 190,769 | 190,769 | 250,000 | (586.37) | |
| 94 | 50 | 1,953 | 197,629 | 197,629 | 250,000 | (494.41) | |
| 95 | 51 | 1,953 | 204,973 | 204,973 | 250,000 | (401.70) | |
| 96 | 52 | 1,953 | 213,158 | 213,158 | 250,000 | (314.80) | |
| 97 | 53 | 1,953 | 222,747 | 222,747 | 250,000 | (235.46) | |
| 98 | 54 | 1,953 | 234,628 | 234,628 | 250,000 | (176.61) | |
| 99 | 55 | 1,953 | 250,248 | 250,248 | 250,048 | (398.97) | |

TABLE D3

Product Value for Money - Calculation of IRR - Level Lapses
Company C

| Age | Duration | Premium | AV | CSV | DB | Cash Flow | IRR |
|---|---|---|---|---|---|---|---|
| 46 | 1 | 2,048 | 1,044 | 0 | 250,000 | 1,949.69 | 4.891% |
| 46 | 2 | 2,048 | 2,589 | 0 | 250,000 | 1,807.47 | |
| 47 | 3 | 2,048 | 4,174 | 0 | 250,000 | 1,674.66 | |
| 48 | 4 | 2,048 | 5,823 | 0 | 250,000 | 1,547.16 | |
| 49 | 5 | 2,048 | 7,551 | 1,227 | 250,000 | 1,367.56 | |
| 50 | 6 | 2,048 | 9,369 | 3,045 | 250,000 | 1,161.15 | |
| 51 | 7 | 2,048 | 11,288 | 4,963 | 250,000 | 955.37 | |
| 52 | 8 | 2,048 | 13,313 | 6,988 | 250,000 | 755.98 | |
| 53 | 9 | 2,048 | 15,446 | 9,122 | 250,000 | 574.37 | |
| 54 | 10 | 2,048 | 17,688 | 11,364 | 250,000 | 399.99 | |
| 55 | 11 | 2,048 | 20,031 | 14,339 | 250,000 | 231.88 | |
| 56 | 12 | 2,048 | 22,451 | 17,391 | 250,000 | 52.38 | |
| 57 | 13 | 2,048 | 24,934 | 20,507 | 250,000 | (123.22) | |
| 58 | 14 | 2,048 | 27,484 | 23,689 | 250,000 | (250.81) | |
| 59 | 15 | 2,048 | 30,102 | 26,939 | 250,000 | (375.86) | |
| 60 | 16 | 2,048 | 32,752 | 30,222 | 250,000 | (530.52) | |
| 61 | 17 | 2,048 | 35,494 | 33,596 | 250,000 | (665.66) | |
| 62 | 18 | 2,048 | 38,330 | 37,065 | 250,000 | (793.72) | |
| 63 | 19 | 2,048 | 41,265 | 40,633 | 250,000 | (916.72) | |
| 64 | 20 | 2,048 | 44,303 | 44,303 | 250,000 | (1,017.10) | |
| 65 | 21 | 2,048 | 47,421 | 47,421 | 250,000 | (1,098.71) | |
| 66 | 22 | 2,048 | 50,616 | 50,616 | 250,000 | (1,163.41) | |
| 67 | 23 | 2,048 | 53,904 | 53,904 | 250,000 | (1,215.43) | |
| 68 | 24 | 2,048 | 57,293 | 57,293 | 250,000 | (1,249.20) | |
| 69 | 25 | 2,048 | 60,782 | 60,782 | 250,000 | (1,277.90) | |
| 70 | 26 | 2,048 | 64,369 | 64,369 | 250,000 | (1,464.07) | |
| 71 | 27 | 2,048 | 68,055 | 68,055 | 250,000 | (1,502.54) | |
| 72 | 28 | 2,048 | 71,843 | 71,843 | 250,000 | (1,537.73) | |
| 73 | 29 | 2,048 | 75,734 | 75,734 | 250,000 | (1,566.79) | |
| 74 | 30 | 2,048 | 79,724 | 79,724 | 250,000 | (1,589.64) | |
| 75 | 31 | 2,048 | 83,809 | 83,809 | 250,000 | (1,598.64) | |
| 76 | 32 | 2,048 | 87,983 | 87,983 | 250,000 | (1,609.07) | |
| 77 | 33 | 2,048 | 92,240 | 92,240 | 250,000 | (1,622.42) | |
| 78 | 34 | 2,048 | 96,575 | 96,575 | 250,000 | (1,627.09) | |
| 79 | 35 | 2,048 | 100,987 | 100,987 | 250,000 | (1,624.02) | |
| 80 | 36 | 2,048 | 105,476 | 105,476 | 250,000 | (1,605.88) | |
| 81 | 37 | 2,048 | 110,047 | 110,047 | 250,000 | (1,573.63) | |
| 82 | 38 | 2,048 | 114,711 | 114,711 | 250,000 | (1,520.67) | |
| 83 | 39 | 2,048 | 119,482 | 119,482 | 250,000 | (1,454.62) | |
| 84 | 40 | 2,048 | 124,363 | 124,363 | 250,000 | (1,390.89) | |
| 85 | 41 | 2,048 | 129,360 | 129,360 | 250,000 | (1,327.61) | |
| 86 | 42 | 2,048 | 134,488 | 134,488 | 250,000 | (1,265.04) | |
| 87 | 43 | 2,048 | 139,768 | 139,768 | 250,000 | (1,186.48) | |
| 88 | 44 | 2,048 | 145,231 | 145,231 | 250,000 | (1,091.00) | |
| 89 | 45 | 2,048 | 150,929 | 150,929 | 250,000 | (982.52) | |
| 90 | 46 | 2,048 | 156,935 | 156,935 | 250,000 | (869.78) | |
| 91 | 47 | 2,048 | 163,342 | 163,342 | 250,000 | (766.55) | |
| 92 | 48 | 2,048 | 170,263 | 170,263 | 250,000 | (667.26) | |
| 93 | 49 | 2,048 | 177,843 | 177,843 | 250,000 | (578.26) | |
| 94 | 50 | 2,048 | 186,264 | 186,264 | 250,000 | (488.83) | |
| 95 | 51 | 2,048 | 195,758 | 195,758 | 250,000 | (398.17) | |

TABLE D3-continued

Product Value for Money - Calculation of IRR - Level Lapses Company C

| Age | Duration | Premium | AV | CSV | DB | Cash Flow | IRR |
|---|---|---|---|---|---|---|---|
| 96 | 52 | 2,048 | 206,617 | 206,617 | 250,000 | (312.81) | |
| 97 | 53 | 2,048 | 219,221 | 219,221 | 250,000 | (234.52) | |
| 98 | 54 | 2,048 | 234,056 | 234,056 | 250,000 | (176.28) | |
| 99 | 55 | 2,048 | 251,745 | 251,745 | 251,745 | (401.25) | |

TABLE D4

Product Value for Money - Calculation of IRR - Level Lapses Company D

| Age | Duration | Premium | AV | CSV | DB | Cash Flow | IRR |
|---|---|---|---|---|---|---|---|
| 45 | 1 | 1,648 | 1,387 | 0 | 250,000 | 1,549.69 | 6.335% |
| 46 | 2 | 1,648 | 2,800 | 0 | 250,000 | 1,427.63 | |
| 47 | 3 | 1,648 | 4,242 | 0 | 250,000 | 1,314.04 | |
| 48 | 4 | 1,648 | 5,717 | 0 | 250,000 | 1,204.85 | |
| 49 | 5 | 1,648 | 7,255 | 523 | 250,000 | 1,071.27 | |
| 50 | 6 | 1,648 | 8,833 | 2,435 | 250,000 | 876.42 | |
| 51 | 7 | 1,648 | 10,482 | 4,430 | 250,000 | 682.52 | |
| 52 | 8 | 1,648 | 12,180 | 6,487 | 250,000 | 496.22 | |
| 53 | 9 | 1,648 | 13,929 | 8,609 | 250,000 | 328.63 | |
| 54 | 10 | 1,648 | 15,705 | 10,772 | 250,000 | 169.71 | |
| 55 | 11 | 1,648 | 17,453 | 12,923 | 250,000 | 38.09 | |
| 56 | 12 | 1,648 | 19,174 | 15,062 | 250,000 | (105.62) | |
| 57 | 13 | 1,648 | 21,011 | 17,333 | 250,000 | (250.46) | |
| 58 | 14 | 1,648 | 22,969 | 19,744 | 250,000 | (351.92) | |
| 59 | 15 | 1,648 | 25,058 | 22,308 | 250,000 | (455.32) | |
| 60 | 16 | 1,648 | 27,287 | 25,032 | 250,000 | (593.21) | |
| 61 | 17 | 1,648 | 29,664 | 27,932 | 250,000 | (714.96) | |
| 62 | 18 | 1,648 | 32,200 | 31,012 | 250,000 | (832.59) | |
| 63 | 19 | 1,648 | 34,905 | 34,295 | 250,000 | (948.10) | |
| 64 | 20 | 1,648 | 37,790 | 37,790 | 250,000 | (1,043.62) | |
| 65 | 21 | 1,648 | 40,816 | 40,816 | 250,000 | (1,122.18) | |
| 66 | 22 | 1,648 | 43,943 | 43,943 | 250,000 | (1,184.43) | |
| 67 | 23 | 1,648 | 47,230 | 47,230 | 250,000 | (1,235.16) | |
| 68 | 24 | 1,648 | 50,616 | 50,616 | 250,000 | (1,267.66) | |
| 69 | 25 | 1,648 | 54,111 | 54,111 | 250,000 | (1,295.26) | |
| 70 | 26 | 1,648 | 57,657 | 57,657 | 250,000 | (1,479.95) | |
| 71 | 27 | 1,648 | 61,286 | 61,286 | 250,000 | (1,516.76) | |
| 72 | 28 | 1,648 | 65,034 | 65,034 | 250,000 | (1,550.58) | |
| 73 | 29 | 1,648 | 68,893 | 68,893 | 250,000 | (1,578.46) | |
| 74 | 30 | 1,648 | 72,878 | 72,878 | 250,000 | (1,600.44) | |
| 75 | 31 | 1,648 | 76,961 | 76,961 | 250,000 | (1,608.63) | |
| 76 | 32 | 1,648 | 81,159 | 81,159 | 250,000 | (1,618.48) | |
| 77 | 33 | 1,648 | 85,490 | 85,490 | 250,000 | (1,631.59) | |
| 78 | 34 | 1,648 | 89,913 | 89,913 | 250,000 | (1,636.04) | |
| 79 | 35 | 1,648 | 94,450 | 94,450 | 250,000 | (1,632.88) | |
| 80 | 36 | 1,648 | 99,103 | 99,103 | 250,000 | (1,614.73) | |
| 81 | 37 | 1,648 | 103,843 | 103,843 | 250,000 | (1,582.35) | |
| 82 | 38 | 1,648 | 108,731 | 108,731 | 250,000 | (1,529.35) | |
| 83 | 39 | 1,648 | 113,745 | 113,745 | 250,000 | (1,463.16) | |
| 84 | 40 | 1,648 | 118,901 | 118,901 | 250,000 | (1,399.27) | |
| 85 | 41 | 1,648 | 124,220 | 124,220 | 250,000 | (1,335.79) | |
| 86 | 42 | 1,648 | 129,756 | 129,756 | 250,000 | (1,273.06) | |
| 87 | 43 | 1,648 | 135,527 | 135,527 | 250,000 | (1,194.30) | |
| 88 | 44 | 1,648 | 141,585 | 141,585 | 250,000 | (1,098.57) | |
| 89 | 45 | 1,648 | 147,976 | 147,976 | 250,000 | (989.76) | |
| 90 | 46 | 1,648 | 154,755 | 154,755 | 250,000 | (876.60) | |
| 91 | 47 | 1,648 | 161,991 | 161,991 | 250,000 | (772.84) | |
| 92 | 48 | 1,648 | 169,755 | 169,755 | 250,000 | (672.90) | |
| 93 | 49 | 1,648 | 178,135 | 178,135 | 250,000 | (583.16) | |
| 94 | 50 | 1,648 | 187,254 | 187,254 | 250,000 | (492.91) | |
| 95 | 51 | 1,648 | 197,236 | 197,236 | 250,000 | (401.41) | |
| 96 | 52 | 1,648 | 208,253 | 208,253 | 250,000 | (315.25) | |

TABLE D4-continued

Product Value for Money - Calculation of IRR - Level Lapses Company D

| Age | Duration | Premium | AV | CSV | DB | Cash Flow | IRR |
|---|---|---|---|---|---|---|---|
| 97 | 53 | 1,648 | 220,519 | 220,519 | 250,000 | (236.24) | |
| 98 | 54 | 1,648 | 234,314 | 234,314 | 250,000 | (177.40) | |
| 99 | 55 | 1,648 | 250,002 | 250,002 | 250,002 | (399.23) | |

In this instance, the objective was to endow at age 100. A planned premium to achieve the objective for each of the example companies A, B, C, and D is shown in Table E.

TABLE E

Product Value for Money - Planned Premium to Achieve Objective

| | Company A | Company B | Company C | Company D |
|---|---|---|---|---|
| Planned Premium to Achieve Objective | $2,125 | $1,953 | $2,048 | $1,648 |

The premiums to meet this objective are annual premiums, which range from $1,648 for Company D to $2,125 for Company A. The high and low points were set at $1,600 (normalized score of 5) and $2,500 (normalized score of 0) respectively, a range of $900. On this scale, Company D got a normalized score of 4.7 (48/900 of the way between 5 and 0).

For product flexibility, one point is given for each of the six features. The high point is 5 and the low point is 0. The interpolation here works out so that the normalized score is the number of points for each product, but not more than 5.

Product flexibility for each of the example companies A, B, C, and D, is shown in Table F.

TABLE F

Product Value for Money - Flexibility

| Flexibility (1 = Y, 0 = N) | Company A | Company B | Company C | Company D |
|---|---|---|---|---|
| No lapse guarantee | 1 | 0 | 0 | 1 |
| Term rider | 1 | 1 | 1 | 1 |
| Penalty-free withdrawals | 1 | 0 | 0 | 1 |
| Preferred loans | 0 | 1 | 1 | 1 |
| COI refunds | 0 | 1 | 0 | 1 |
| Persistency bonus | 1 | 0 | 1 | 0 |
| Total | 4 | 3 | 3 | 5 |

Finally, the weighted average of the four metrics is calculated, giving effect to the weights from table A.

Product Stress Tolerance

A similar process is followed for this scoring driver. For two of the policies, Company A and Company C, the illustration at the midpoint in this example does not produce an IRR because the product failed. I.e., the policyholder group, on average, did not get back as much money as they put in. In those cases, the ratio of 20-year Cash Surrender Values provides a more discriminating metric.

Calculations for Product Stress Tolerance for each of the example companies is shown in Table G1-G4.

TABLE G1

Product Stress Tolerance - Midpoint Assumptions
Company A

| Age | Duration | Premium | Current CSV | DB | Midpoint Cash Value | Cash Flow | IRR |
|---|---|---|---|---|---|---|---|
| 45 | 1 | 2,125 | 0 | 250,000 | 0 | 2,026.69 | 0.00% |
| 46 | 2 | 2,125 | 0 | 250,000 | 0 | 1,880.59 | |
| 47 | 3 | 2,125 | 0 | 250,000 | 0 | 1,744.08 | |
| 48 | 4 | 2,125 | 0 | 250,000 | 0 | 1,613.06 | |
| 49 | 5 | 2,125 | 567 | 250,000 | 0 | 1,479.89 | |
| 50 | 6 | 2,125 | 2,751 | 250,000 | 43 | 1,336.05 | |
| 51 | 7 | 2,125 | 5,064 | 250,000 | 1,485 | 1,138.59 | |
| 52 | 8 | 2,125 | 7,483 | 250,000 | 2,904 | 950.61 | |
| 53 | 9 | 2,125 | 10,037 | 250,000 | 4,298 | 783.00 | |
| 54 | 10 | 2,125 | 12,732 | 250,000 | 5,651 | 625.12 | |
| 55 | 11 | 2,125 | 16,396 | 250,000 | 7,798 | 469.26 | |
| 56 | 12 | 2,125 | 19,944 | 250,000 | 9,664 | 309.87 | |
| 57 | 13 | 2,125 | 23,446 | 250,000 | 11,265 | 159.95 | |
| 58 | 14 | 2,125 | 26,908 | 250,000 | 12,581 | 62.96 | |
| 59 | 15 | 2,125 | 30,338 | 250,000 | 13,619 | (27.83) | |
| 60 | 16 | 2,125 | 33,278 | 250,000 | 13,867 | (135.15) | |
| 61 | 17 | 2,125 | 36,352 | 250,000 | 13,910 | (223.70) | |
| 62 | 18 | 2,125 | 39,560 | 250,000 | 13,703 | (305.59) | |
| 63 | 19 | 2,125 | 42,908 | 250,000 | 13,199 | (382.65) | |
| 64 | 20 | 2,125 | 46,398 | 250,000 | 12,343 | (437.14) | |
| 65 | 21 | 2,125 | 50,054 | 250,000 | 11,087 | (483.63) | |
| 66 | 22 | 2,125 | 53,858 | 250,000 | 9,359 | (512.22) | |
| 67 | 23 | 2,125 | 57,809 | 250,000 | 7,087 | (526.89) | |
| 68 | 24 | 2,125 | 61,906 | 250,000 | 4,190 | (521.98) | |
| 69 | 25 | 2,125 | 66,140 | 250,000 | 560 | (510.49) | |
| 70 | 26 | 2,125 | 70,502 | 250,000 | 0 | (701.52) | |

TABLE G2

Product Stress Tolerance - Midpoint Assumptions
Company B

| Age | Duration | Premium | Current CSV | DB | Midpoint Cash Value | Cash Flow | IRR |
|---|---|---|---|---|---|---|---|
| 45 | 1 | 1,953 | 0 | 250,000 | 0 | 1,854.69 | 0.00% |
| 46 | 2 | 1,953 | 0 | 250,000 | 0 | 1,717.26 | |
| 47 | 3 | 1,953 | 0 | 250,000 | 0 | 1,589.02 | |
| 48 | 4 | 1,953 | 663 | 250,000 | 0 | 1,465.86 | |
| 49 | 5 | 1,953 | 2,911 | 250,000 | 975 | 1,300.63 | |
| 50 | 6 | 1,953 | 5,394 | 250,000 | 3,231 | 1,080.79 | |
| 51 | 7 | 1,953 | 7,992 | 250,000 | 4,787 | 892.36 | |
| 52 | 8 | 1,953 | 10,713 | 250,000 | 6,417 | 709.93 | |
| 53 | 9 | 1,953 | 13,561 | 250,000 | 8,123 | 544.75 | |
| 54 | 10 | 1,953 | 16,541 | 250,000 | 9,908 | 386.11 | |
| 55 | 11 | 1,953 | 19,637 | 250,000 | 10,906 | 276.80 | |
| 56 | 12 | 1,953 | 22,847 | 250,000 | 11,903 | 151.91 | |
| 57 | 13 | 1,953 | 26,164 | 250,000 | 12,901 | 26.46 | |
| 58 | 14 | 1,953 | 29,593 | 250,000 | 13,898 | (55.26) | |
| 59 | 15 | 1,953 | 33,139 | 250,000 | 14,896 | (138.52) | |
| 60 | 16 | 1,953 | 36,537 | 250,000 | 15,894 | (256.16) | |
| 61 | 17 | 1,953 | 39,699 | 250,000 | 16,891 | (357.65) | |
| 62 | 18 | 1,953 | 43,164 | 250,000 | 17,889 | (455.34) | |
| 63 | 19 | 1,953 | 46,756 | 250,000 | 18,886 | (551.17) | |
| 64 | 20 | 1,953 | 50,474 | 250,000 | 19,884 | (627.54) | |
| 65 | 21 | 1,953 | 54,284 | 250,000 | 18,249 | (656.13) | |
| 66 | 22 | 1,953 | 58,225 | 250,000 | 16,615 | (675.28) | |
| 67 | 23 | 1,953 | 62,293 | 250,000 | 14,980 | (688.59) | |
| 68 | 24 | 1,953 | 66,487 | 250,000 | 13,345 | (689.93) | |
| 69 | 25 | 1,953 | 70,804 | 250,000 | 11,711 | (692.11) | |
| 70 | 26 | 1,953 | 75,241 | 250,000 | 10,076 | (858.28) | |
| 71 | 27 | 1,953 | 79,781 | 250,000 | 9,068 | (889.97) | |
| 72 | 28 | 1,953 | 84,421 | 250,000 | 8,061 | (922.85) | |
| 73 | 29 | 1,953 | 89,158 | 250,000 | 7,053 | (953.88) | |
| 74 | 30 | 1,953 | 93,985 | 250,000 | 6,046 | (982.81) | |
| 75 | 31 | 1,953 | 98,880 | 250,000 | 5,038 | (1,001.76) | |
| 76 | 32 | 1,953 | 103,828 | 250,000 | 4,030 | (1,025.81) | |
| 77 | 33 | 1,953 | 108,814 | 250,000 | 3,023 | (1,056.41) | |
| 78 | 34 | 1,953 | 113,823 | 250,000 | 2,015 | (1,081.81) | |

TABLE G2-continued

Product Stress Tolerance - Midpoint Assumptions
Company B

| Age | Duration | Premium | Current CSV | DB | Midpoint Cash Value | Cash Flow | IRR |
|---|---|---|---|---|---|---|---|
| 79 | 35 | 1,953 | 118,843 | 250,000 | 1,008 | (1,102.67) | |
| 80 | 36 | 1,953 | 123,863 | 250,000 | — | (1,111.30) | |

TABLE G3

Product Stress Tolerance - Midpoint Assumptions
Company C

| Age | Duration | Premium | Current CSV | DB | Midpoint Cash Value | Cash Flow | IRR |
|---|---|---|---|---|---|---|---|
| 45 | 1 | 2,048 | 0 | 250,000 | 0 | 1,949.69 | 0.00% |
| 46 | 2 | 2,048 | 0 | 250,000 | 0 | 1,807.47 | |
| 47 | 3 | 2,048 | 0 | 250,000 | 0 | 1,674.66 | |
| 48 | 4 | 2,048 | 0 | 250,000 | 0 | 1,547.16 | |
| 49 | 5 | 2,048 | 1,227 | 250,000 | 0 | 1,417.35 | |
| 50 | 6 | 2,048 | 3,045 | 250,000 | 1,664 | 1,214.32 | |
| 51 | 7 | 2,048 | 4,963 | 250,000 | 2,712 | 1,037.53 | |
| 52 | 8 | 2,048 | 6,988 | 250,000 | 3,819 | 865.63 | |
| 53 | 9 | 2,048 | 9,122 | 250,000 | 4,985 | 709.95 | |
| 54 | 10 | 2,048 | 11,364 | 250,000 | 6,210 | 559.91 | |
| 55 | 11 | 2,048 | 14,339 | 250,000 | 6,366 | 466.00 | |
| 56 | 12 | 2,048 | 17,391 | 250,000 | 7,721 | 320.96 | |
| 57 | 13 | 2,048 | 20,507 | 250,000 | 9,104 | 176.13 | |
| 58 | 14 | 2,048 | 23,689 | 250,000 | 10,517 | 75.84 | |
| 59 | 15 | 2,048 | 26,939 | 250,000 | 11,960 | (25.16) | |
| 60 | 16 | 2,048 | 30,222 | 250,000 | 13,418 | (159.36) | |
| 61 | 17 | 2,048 | 33,596 | 250,000 | 14,915 | (276.82) | |
| 62 | 18 | 2,048 | 37,065 | 250,000 | 16,456 | (389.85) | |
| 63 | 19 | 2,048 | 40,633 | 250,000 | 18,040 | (500.38) | |
| 64 | 20 | 2,048 | 44,303 | 250,000 | 19,669 | (590.74) | |
| 65 | 21 | 2,048 | 47,421 | 250,000 | 18,536 | (629.74) | |
| 66 | 22 | 2,048 | 50,616 | 250,000 | 17,404 | (658.18) | |
| 67 | 23 | 2,048 | 53,904 | 250,000 | 16,271 | (679.72) | |
| 68 | 24 | 2,048 | 57,293 | 250,000 | 15,138 | (688.31) | |
| 69 | 25 | 2,048 | 60,782 | 250,000 | 14,006 | (696.82) | |
| 70 | 26 | 2,048 | 64,369 | 250,000 | 12,873 | (868.42) | |
| 71 | 27 | 2,048 | 68,055 | 250,000 | 8,582 | (864.12) | |
| 72 | 28 | 2,048 | 71,843 | 250,000 | 4,291 | (866.25) | |
| 73 | 29 | 2,048 | 75,734 | 250,000 | 0 | (871.43) | |

TABLE G4

Product Stress Tolerance - Midpoint Assumptions
Company D

| Age | Duration | Premium | Current CSV | DB | Midpoint Cash Value | Cash Flow | IRR |
|---|---|---|---|---|---|---|---|
| 45 | 1 | 1,648 | 0 | 250,000 | 0 | 1,549.69 | 0.00% |
| 46 | 2 | 1,648 | 0 | 250,000 | 0 | 1,427.63 | |
| 47 | 3 | 1,648 | 0 | 250,000 | 0 | 1,314.04 | |
| 48 | 4 | 1,648 | 0 | 250,000 | 0 | 1,204.85 | |
| 49 | 5 | 1,648 | 523 | 250,000 | 0 | 1,092.50 | |
| 50 | 6 | 1,648 | 2,435 | 250,000 | 1,055 | 929.53 | |
| 51 | 7 | 1,648 | 4,430 | 250,000 | 1,920 | 774.13 | |
| 52 | 8 | 1,648 | 6,487 | 250,000 | 2,812 | 623.36 | |
| 53 | 9 | 1,648 | 8,609 | 250,000 | 3,731 | 488.47 | |
| 54 | 10 | 1,648 | 10,772 | 250,000 | 4,669 | 359.07 | |
| 55 | 11 | 1,648 | 12,923 | 250,000 | 5,281 | 262.50 | |
| 56 | 12 | 1,648 | 15,062 | 250,000 | 5,892 | 149.06 | |
| 57 | 13 | 1,648 | 17,333 | 250,000 | 6,504 | 33.83 | |
| 58 | 14 | 1,648 | 19,744 | 250,000 | 7,116 | (38.76) | |
| 59 | 15 | 1,648 | 22,308 | 250,000 | 7,728 | (113.95) | |
| 60 | 16 | 1,648 | 25,032 | 250,000 | 8,339 | (224.52) | |
| 61 | 17 | 1,648 | 27,932 | 250,000 | 8,951 | (319.86) | |
| 62 | 18 | 1,648 | 31,012 | 250,000 | 9,563 | (412.26) | |
| 63 | 19 | 1,648 | 34,295 | 250,000 | 10,174 | (503.62) | |

TABLE G4-continued

Product Stress Tolerance - Midpoint Assumptions
Company D

| Age | Duration | Premium | Current CSV | DB | Midpoint Cash Value | Cash Flow | IRR |
|---|---|---|---|---|---|---|---|
| 64 | 20 | 1,648 | 37,790 | 250,000 | 10,786 | (576.25) | |
| 65 | 21 | 1,648 | 40,816 | 250,000 | 8,835 | (602.94) | |
| 66 | 22 | 1,648 | 43,943 | 250,000 | 6,884 | (620.69) | |
| 67 | 23 | 1,648 | 47,230 | 250,000 | 4,933 | (633.05) | |
| 68 | 24 | 1,648 | 50,616 | 250,000 | 2,982 | (633.85) | |
| 69 | 25 | 1,648 | 54,111 | 250,000 | 1,031 | (635.87) | |
| 70 | 26 | 1,648 | 57,657 | 250,000 | 0 | (813.04) | |

The ratios of 20-Year cash values on midpoint and current assumptions are shown in Table H, and the years in force at midpoint assumptions are shown in Table I.

TABLE H

Product Stress Tolerance - Ratio of 20-year
Cash Values on Midpoint and Current Assumptions

| | Company A | Company B | Company C | Company D |
|---|---|---|---|---|
| $CV_{20}^{MIDPOINT}$ | 12,343 | 19,884 | 19,669 | 10,786 |
| $CV_{20}^{CURRENT}$ | 46,398 | 50,474 | 44,303 | 37,790 |
| Ratio | 26.60% | 39.39% | 44.40% | 28.54% |

TABLE I

Product Stress Tolerance -
Years in Force at Midpoint Assumptions

| | Company A | Company B | Company C | Company D |
|---|---|---|---|---|
| Years in force at Midpoint Assumptions | 26 | 36 | 29 | 26 |

Calculation of IRR premium reduction in years 4 and later for each of the example companies is shown in Tables J1-J4.

TABLE J1

Product Stress Tolerance - Calculation of IRR
Premium Reduction in Years 4 and Later
Company A

| Age | Duration | Premium | AV | CSV | DB | Cash Flow | IRR |
|---|---|---|---|---|---|---|---|
| 45 | 1 | 2,125 | 525 | 0 | 250,000 | 2,026.69 | 2.642% |
| 46 | 2 | 2,125 | 2,001 | 0 | 250,000 | 1,880.59 | |
| 47 | 3 | 2,125 | 3,564 | 0 | 250,000 | 1,744.08 | |
| 48 | 4 | 1,063 | 4,147 | 0 | 250,000 | 703.80 | |
| 49 | 5 | 1,063 | 4,739 | 0 | 250,000 | 616.99 | |
| 50 | 6 | 1,063 | 5,380 | 0 | 250,000 | 519.02 | |
| 51 | 7 | 1,063 | 6,057 | 308 | 250,000 | 405.11 | |
| 52 | 8 | 1,063 | 6,740 | 1,328 | 250,000 | 269.08 | |
| 53 | 9 | 1,063 | 7,450 | 2,390 | 250,000 | 148.11 | |
| 54 | 10 | 1,063 | 8,184 | 3,489 | 250,000 | 31.72 | |
| 55 | 11 | 1,063 | 8,872 | 5,419 | 250,000 | (86.08) | |
| 56 | 12 | 1,063 | 9,452 | 7,100 | 250,000 | (210.45) | |
| 57 | 13 | 1,063 | 10,004 | 8,599 | 250,000 | (329.38) | |
| 58 | 14 | 1,063 | 10,524 | 9,908 | 250,000 | (399.22) | |
| 59 | 15 | 1,063 | 10,986 | 10,986 | 250,000 | (465.25) | |
| 60 | 16 | 1,063 | 11,395 | 11,395 | 250,000 | (551.58) | |
| 61 | 17 | 1,063 | 11,745 | 11,745 | 250,000 | (622.76) | |

TABLE J1-continued

Product Stress Tolerance - Calculation of IRR
Premium Reduction in Years 4 and Later
Company A

| Age | Duration | Premium | AV | CSV | DB | Cash Flow | IRR |
|---|---|---|---|---|---|---|---|
| 62 | 18 | 1,063 | 12,018 | 12,018 | 250,000 | (690.90) | |
| 63 | 19 | 1,063 | 12,199 | 12,199 | 250,000 | (757.83) | |
| 64 | 20 | 1,063 | 12,271 | 12,271 | 250,000 | (805.78) | |
| 65 | 21 | 1,063 | 12,234 | 12,234 | 250,000 | (849.45) | |
| 66 | 22 | 1,063 | 12,042 | 12,042 | 250,000 | (878.51) | |
| 67 | 23 | 1,063 | 11,660 | 11,660 | 250,000 | (896.75) | |
| 68 | 24 | 1,063 | 11,050 | 11,050 | 250,000 | (898.26) | |
| 69 | 25 | 1,063 | 10,159 | 10,159 | 250,000 | (895.97) | |
| 70 | 26 | 1,063 | 8,926 | 8,926 | 250,000 | (1,053.17) | |
| 71 | 27 | 1,063 | 7,272 | 7,272 | 250,000 | (1,064.09) | |
| 72 | 28 | 1,063 | 5,100 | 5,100 | 250,000 | (1,072.71) | |
| 73 | 29 | 1,063 | 2,290 | 2,290 | 250,000 | (1,075.96) | |
| 74 | 30 | 0 | 0 | 0 | 0 | 0 | |

TABLE J2

Product Stress Tolerance - Calculation of IRR
Premium Reduction in Years 4 and Later
Company B

| Age | Duration | Premium | AV | CSV | DB | Cash Flow | IRR |
|---|---|---|---|---|---|---|---|
| 45 | 1 | 1,953 | 909 | 0 | 250,000 | 1,854.69 | 5.883% |
| 46 | 2 | 1,953 | 2,409 | 0 | 250,000 | 1,717.26 | |
| 47 | 3 | 1,953 | 3,972 | 0 | 250,000 | 1,589.02 | |
| 48 | 4 | 977 | 4,669 | 0 | 250,000 | 630.20 | |
| 49 | 5 | 977 | 5,430 | 907 | 250,000 | 510.34 | |
| 50 | 6 | 977 | 6,356 | 2,285 | 250,000 | 364.79 | |
| 51 | 7 | 977 | 7,322 | 3,704 | 250,000 | 218.31 | |
| 52 | 8 | 977 | 8,330 | 5,164 | 250,000 | 76.80 | |
| 53 | 9 | 977 | 9,379 | 6,665 | 250,000 | (48.43) | |
| 54 | 10 | 977 | 10,467 | 8,205 | 250,000 | (168.07) | |
| 55 | 11 | 977 | 11,570 | 9,761 | 250,000 | (264.18) | |
| 56 | 12 | 977 | 12,679 | 11,322 | 250,000 | (375.59) | |
| 57 | 13 | 977 | 13,777 | 12,873 | 250,000 | (486.86) | |
| 58 | 14 | 977 | 14,860 | 14,407 | 250,000 | (553.56) | |
| 59 | 15 | 977 | 15,920 | 15,920 | 250,000 | (621.17) | |
| 60 | 16 | 977 | 16,956 | 16,956 | 250,000 | (712.53) | |
| 61 | 17 | 977 | 17,950 | 17,950 | 250,000 | (787.86) | |
| 62 | 18 | 977 | 18,890 | 18,890 | 250,000 | (859.42) | |
| 63 | 19 | 977 | 19,760 | 19,760 | 250,000 | (929.02) | |
| 64 | 20 | 977 | 20,542 | 20,542 | 250,000 | (978.87) | |
| 65 | 21 | 977 | 21,172 | 21,172 | 250,000 | (1,022.67) | |
| 66 | 22 | 977 | 21,672 | 21,672 | 250,000 | (1,051.35) | |
| 67 | 23 | 977 | 22,008 | 22,008 | 250,000 | (1,068.72) | |
| 68 | 24 | 977 | 22,148 | 22,148 | 250,000 | (1,068.99) | |
| 69 | 25 | 977 | 22,048 | 22,048 | 250,000 | (1,065.22) | |

TABLE J2-continued

Product Stress Tolerance - Calculation of IRR Premium Reduction in Years 4 and Later Company B

| Age | Duration | Premium | AV | CSV | DB | Cash Flow | IRR |
|---|---|---|---|---|---|---|---|
| 70 | 26 | 977 | 21,664 | 21,664 | 250,000 | (1,220.62) | |
| 71 | 27 | 977 | 20,921 | 20,921 | 250,000 | (1,229.29) | |
| 72 | 28 | 977 | 19,756 | 19,756 | 250,000 | (1,235.71) | |
| 73 | 29 | 977 | 18,093 | 18,093 | 250,000 | (1,237.07) | |
| 74 | 30 | 977 | 15,837 | 15,837 | 250,000 | (1,233.34) | |
| 75 | 31 | 977 | 12,854 | 12,854 | 250,000 | (1,216.73) | |
| 76 | 32 | 977 | 8,998 | 8,998 | 250,000 | (1,202.59) | |
| 77 | 33 | 977 | 4,091 | 4,091 | 250,000 | (1,192.59) | |

TABLE J3

Product Stress Tolerance - Calculation of IRR Premium Reduction in Years 4 and Later Company C

| Age | Duration | Premium | AV | CSV | DB | Cash Flow | IRR |
|---|---|---|---|---|---|---|---|
| 45 | 1 | 2,048 | 1,098 | 0 | 250,000 | 1,949.69 | 3.824% |
| 46 | 2 | 2,048 | 2,705 | 0 | 250,000 | 1,807.47 | |
| 47 | 3 | 2,048 | 4,357 | 0 | 250,000 | 1,674.66 | |
| 48 | 4 | 1,024 | 5,041 | 0 | 250,000 | 670.85 | |
| 49 | 5 | 1,024 | 5,740 | 0 | 250,000 | 585.72 | |
| 50 | 6 | 1,024 | 6,463 | 138 | 250,000 | 484.04 | |
| 51 | 7 | 1,024 | 7,214 | 890 | 250,000 | 355.73 | |
| 52 | 8 | 1,024 | 7,996 | 1,671 | 250,000 | 230.54 | |
| 53 | 9 | 1,024 | 8,804 | 2,480 | 250,000 | 119.89 | |
| 54 | 10 | 1,024 | 9,633 | 3,309 | 250,000 | 13.37 | |
| 55 | 11 | 1,024 | 10,469 | 4,777 | 250,000 | (89.88) | |
| 56 | 12 | 1,024 | 11,279 | 6,219 | 250,000 | (207.41) | |
| 57 | 13 | 1,024 | 12,041 | 7,614 | 250,000 | (323.79) | |
| 58 | 14 | 1,024 | 12,750 | 8,955 | 250,000 | (394.73) | |
| 59 | 15 | 1,024 | 13,396 | 10,233 | 250,000 | (465.71) | |
| 60 | 16 | 1,024 | 13,929 | 11,399 | 250,000 | (568.73) | |
| 61 | 17 | 1,024 | 14,402 | 12,505 | 250,000 | (654.67) | |
| 62 | 18 | 1,024 | 14,804 | 13,539 | 250,000 | (735.86) | |
| 63 | 19 | 1,024 | 15,126 | 14,494 | 250,000 | (814.38) | |
| 64 | 20 | 1,024 | 15,356 | 15,356 | 250,000 | (872.58) | |
| 65 | 21 | 1,024 | 15,450 | 15,450 | 250,000 | (914.24) | |
| 66 | 22 | 1,024 | 15,382 | 15,382 | 250,000 | (941.12) | |
| 67 | 23 | 1,024 | 15,123 | 15,123 | 250,000 | (957.09) | |
| 68 | 24 | 1,024 | 14,541 | 14,641 | 250,000 | (956.37) | |
| 69 | 25 | 1,024 | 13,897 | 13,897 | 250,000 | (952.06) | |
| 70 | 26 | 1,024 | 12,851 | 12,851 | 250,000 | (1,107.57) | |
| 71 | 27 | 1,024 | 11,456 | 11,456 | 250,000 | (1,117.37) | |
| 72 | 28 | 1,024 | 9,665 | 9,665 | 250,000 | (1,125.84) | |
| 73 | 29 | 1,024 | 7,418 | 7,418 | 250,000 | (1,130.21) | |
| 74 | 30 | 1,024 | 4,643 | 4,643 | 250,000 | (1,130.51) | |
| 75 | 31 | 1,024 | 1,251 | 1,251 | 250,000 | (1,119.09) | |

TABLE J4

Product Stress Tolerance - Calculation of IRR Premium Reduction in Years 4 and Later Company D

| Age | Duration | Premium | AV | CSV | DB | Cash Flow | IRR |
|---|---|---|---|---|---|---|---|
| 45 | 1 | 1,648 | 1,387 | 0 | 250,000 | 1,549.69 | 6.823% |
| 46 | 2 | 1,648 | 2,800 | 0 | 250,000 | 1,427.63 | |
| 47 | 3 | 1,648 | 4,243 | 0 | 250,000 | 1,314.04 | |

TABLE J4-continued

Product Stress Tolerance - Calculation of IRR Premium Reduction in Years 4 and Later Company D

| Age | Duration | Premium | AV | CSV | DB | Cash Flow | IRR |
|---|---|---|---|---|---|---|---|
| 48 | 4 | 824 | 4,902 | 0 | 250,000 | 499.70 | |
| 49 | 5 | 824 | 5,572 | 0 | 250,000 | 423.29 | |
| 50 | 6 | 824 | 6,226 | 0 | 250,000 | 335.25 | |
| 51 | 7 | 824 | 6,892 | 839 | 250,000 | 211.44 | |
| 52 | 8 | 824 | 7,541 | 1,848 | 250,000 | 85.87 | |
| 53 | 9 | 824 | 8,172 | 2,852 | 250,000 | (23.57) | |
| 54 | 10 | 824 | 8,755 | 3,822 | 250,000 | (126.87) | |
| 55 | 11 | 824 | 9,227 | 4,697 | 250,000 | (205.22) | |
| 56 | 12 | 824 | 9,582 | 5,469 | 250,000 | (297.93) | |
| 57 | 13 | 824 | 9,961 | 6,283 | 250,000 | (394.13) | |
| 58 | 14 | 824 | 10,364 | 7,139 | 250,000 | (449.17) | |
| 59 | 15 | 824 | 10,795 | 8,045 | 250,000 | (508.42) | |
| 60 | 16 | 824 | 11,255 | 9,000 | 250,000 | (604.41) | |
| 61 | 17 | 824 | 11,745 | 10,013 | 250,000 | (686.39) | |
| 62 | 18 | 824 | 12,268 | 11,081 | 250,000 | (766.44) | |
| 63 | 19 | 824 | 12,826 | 12,216 | 250,000 | (846.49) | |
| 64 | 20 | 824 | 13,421 | 13,421 | 250,000 | (908.71) | |
| 65 | 21 | 824 | 13,998 | 13,998 | 250,000 | (956.02) | |
| 66 | 22 | 824 | 14,496 | 14,496 | 250,000 | (988.90) | |
| 67 | 23 | 824 | 14,970 | 14,970 | 250,000 | (1,012.28) | |
| 68 | 24 | 824 | 15,332 | 15,332 | 250,000 | (1,019.21) | |
| 69 | 25 | 824 | 15,573 | 15,573 | 250,000 | (1,022.99) | |
| 70 | 26 | 824 | 15,598 | 15,598 | 250,000 | (1,186.11) | |
| 71 | 27 | 824 | 15,423 | 15,423 | 250,000 | (1,203.39) | |
| 72 | 28 | 824 | 15,061 | 15,061 | 250,000 | (1,219.74) | |
| 73 | 29 | 824 | 14,469 | 14,469 | 250,000 | (1,232.19) | |
| 74 | 30 | 824 | 13,629 | 13,629 | 250,000 | (1,240.86) | |
| 75 | 31 | 824 | 12,463 | 12,463 | 250,000 | (1,237.78) | |
| 76 | 32 | 824 | 10,945 | 10,945 | 250,000 | (1,238.53) | |
| 77 | 33 | 824 | 9,043 | 9,043 | 250,000 | (1,244.89) | |
| 78 | 34 | 824 | 6,633 | 6,633 | 250,000 | (1,244.96) | |
| 79 | 35 | 824 | 3,670 | 3,670 | 250,000 | (1,239.95) | |
| 80 | 36 | 824 | 67 | 67 | 250,000 | (1,222.52) | |

Management Performance

In order to set reasonable high and low points for this scoring driver, a universe of ten companies is examined, and the metrics for each one computed based on recent statutory filings. In this example, statutory filing as of Dec. 31, 2000 were examined. Where a company is a subsidiary of a larger life insurer, consolidated statutory numbers from the NAIC database are used. Management performance statistics for each of the companies A, B, C, and D are shown in Table K.

TABLE K

Management Performance Statistics

| Management Performance | Company A | Company B | Company C | Company D | Company E | Company F | Company G | Company H | Company I | Company J |
|---|---|---|---|---|---|---|---|---|---|---|
| 5-year Average ROE | 7.1% | 11.0% | 12.9% | 13.6% | 1.8% | 26.9% | 8.9% | 18.1% | 14.1% | 23.3% |
| Ordinary Life Expenses/Generally Recognized Expense Table | 166.3% | 608.2% | 342.4% | 197.5% | 206.1% | 122.4% | 73.7% | 372.3% | 495.5% | 181.9% |
| 5-year Average PEGG | 4.2% | 8.8% | −3.6% | 118.1% | 157.4% | 6.2% | −16.5% | −3.8% | 8.2% | −0.3% |
| 5-year Assets CAGR | 12.1% | 25.5% | 6.6% | 23.4% | 38.8% | 8.3% | 12.5% | 9.5% | 24.1% | 10.9% |
| Maximum Earnings Deviation from Geometric Path | 366.5% | 108.6% | 44.2% | 24.4% | 162.9% | 52.1% | 48.4% | 125.1% | 62.9% | 23.1% |
| Ordinary Life Expenses/Ordinary Life Premiums | 17.7% | 22.7% | 22.4% | 14.4% | 11.6% | 6.5% | 2.3% | 15.1% | 12.6% | 6.6% |
| Ordinary Life Expenses/Ordinary Life Reserves | 3.6% | 2.3% | 2.9% | 1.6% | 9.5% | 0.9% | 1.1% | 2.0% | 1.6% | 0.9% |

Historical Credited Rates

The high point is set at $6,150 and the low point at $5,800. Company D, being above the high point, receives a normalized score of 5. Historical credit rates are shown in Table L.

TABLE L

Historical Credited Rates

| | Company A | Company B | Company C | Company D |
|---|---|---|---|---|
| 1996 | 8.00% | 8.30% | 8.40% | 8.50% |
| 1997 | 7.50% | 7.60% | 7.80% | 8.00% |
| 1998 | 7.00% | 6.90% | 7.20% | 7.50% |
| 1999 | 6.50% | 6.20% | 6.60% | 7.00% |
| 2000 | 6.00% | 5.50% | 6.00% | 6.50% |
| $1,000 Accumulated to 2001: | | | | |
| | $6,098 | $6,058 | $6,123 | $6,188 |

Company Service Quality

Company service quality indicators are shown in Table M for the example companies A, B, C, and D.

TABLE M

Company Service Quality Indicators

| | Co. A | Co. B | Co. C | Co. D | Low Score | High Score |
|---|---|---|---|---|---|---|
| Average Time to Offer | 60 | 30 | 45 | 15 | 15 | 60 |
| Telephone Service - Composite Score: | 5.0 | 4.0 | 3.5 | 2.5 | | |
| Days/week CSRs available | 5 | 5 | 5 | 5 | 5 | 5 |
| Avg # of calls/day per CSR | 30 | 40 | 50 | 60 | 30 | 60 |
| Hours/day customer service available | 8 | 9 | 9 | 10 | 8 | 10 |
| 800 # available (1 = Y, 0 = N) | 1 | 1 | 1 | 1 | 1 | 1 |
| Website Capabilities (1 = Y, 0 = N) | | | | | | |
| Website | 1 | 1 | 1 | 1 | | |
| Specific product information available | 1 | 1 | 1 | 0 | | |
| Quote capabilities | 0 | 0 | 0 | 0 | | |
| Ability to apply online | 0 | 0 | 0 | 0 | | |
| Ability to access account information | 0 | 0 | 0 | 0 | | |
| Ability to change address, beneficiary | 0 | 0 | 0 | 0 | | |
| Application status capabilities | 0 | 0 | 0 | 0 | | |
| Total | 2 | 1 | 0 | 0 | 0 | 7 |
| Standard Requests - days to process | | | | | | |
| Cash loans | 5 | 4 | 5 | 3 | | |
| Cash surrenders | 6 | 6 | 5 | 4 | | |
| Non-contestable death claims | 5 | 5 | 4 | 3 | | |
| Customer correspondence | 6 | 8 | 5 | 4 | | |
| Average | 5.5 | 5.75 | 4.75 | 3.5 | 3 | 5 |

Best's Rating

Best's rating for the example companies A, B, C, and D are shown in Table N.

TABLE N

Number of companies by Best Ratings

| | | | Percentile | Score |
|---|---|---|---|---|
| A++ | 46 | 11.3% | 100.0% | 5.0 |
| A+ | 147 | 36.1% | 88.7% | 4.4 |
| A | 123 | 30.2% | 52.6% | 2.6 |
| A− | 52 | 12.8% | 22.4% | 1.1 |
| B++ | 22 | 5.4% | 9.6% | 0.5 |
| B+ | 15 | 3.7% | 4.2% | 0.2 |
| E | 2 | 0.5% | 0.5% | 0.0 |
| Total | 407 | | | |

Company A A
Company B A++
Company C A
Company D A++

PVAS Rating

The PVAS rating is a weighted average of the normalized scores on each of the scoring drivers. This calculation is summarized in Table O.

TABLE O

PVAS Calculation Summary

|  | Company A | Company B | Company C | Company D |
|---|---|---|---|---|
| PVAS Rating (Out of 5 Points): | 1.8 | 3.6 | 2.5 | 4.0 |
| I. Product Value for Money | 1.6 | 3.7 | 1.8 | 4.8 |
| II. Product Stress Tolerance | 0.3 | 3.9 | 3.3 | 1.6 |
| III. Management Performance | 1.9 | 2.6 | 2.2 | 4.0 |
| IV. Product Crediting Rate History | 4.3 | 3.7 | 4.6 | 5.0 |
| V. Company Service Quality | 2.4 | 3.5 | 2.9 | 3.9 |
| VI. AM Best Rating | 2.6 | 5.0 | 2.6 | 5.0 |
| I. Product Value for Money | | | | |
| IRR - current assumptions, LIMRA lapses | 1.4 | 4.2 | 1.7 | 5.0 |
| IRR - current assumptions, level lapses | 0.8 | 3.8 | 1.0 | 4.6 |
| Planned Premium to Achieve Objective | 2.1 | 3.0 | 2.5 | 4.7 |
| Product Flexibility | 4.0 | 3.0 | 3.0 | 5.0 |
| Score | 1.6 | 3.7 | 1.8 | 4.8 |
| II. Product Stress Tolerance | | | | |
| Ratio of 20-year CSV for midpoint: current assumptions | 0.4 | 3.6 | 4.8 | 0.9 |
| Years in Force at Midpoint Assumption | 0.5 | 5.0 | 2.0 | 0.5 |
| IRR - current assumptions with 50% premium years 4+ | 0.0 | 3.5 | 0.0 | 5.0 |
| Score | 0.3 | 3.9 | 3.3 | 1.6 |
| III. Management Performance | | | | |
| 5-year Average ROE | 0.0 | 2.5 | 3.7 | 4.1 |
| Ordinary Life Expenses/GRET | 3.7 | 0.0 | 0.0 | 2.8 |
| 5-year Average Premium Expense Growth Gap | 4.4 | 5.0 | 0.0 | 5.0 |
| 5-year Assets CAGR | 2.5 | 5.0 | 0.8 | 5.0 |
| Maximum Earnings Deviation from Geometric Path | 3.7 | 5.0 | 5.0 | 5.0 |
| Ordinary Life Expenses/Ordinary Life Premium | 1.6 | 0.1 | 0.2 | 2.5 |
| Ordinary Life Expenses/Ordinary Life Reserves | 0.7 | 2.8 | 1.9 | 4.0 |
| Score | 1.9 | 2.6 | 2.2 | 4.0 |
| IV. Historical Credited Rates | | | | |
| Score | 4.3 | 3.7 | 4.6 | 5.0 |
| V. Company Service Quality | | | | |
| Average time to offer | 2.0 | 4.0 | 3.0 | 5.0 |
| Telephone service | 5.0 | 4.0 | 3.5 | 2.5 |
| Website capabilities | 1.4 | 1.4 | 1.4 | 0.7 |
| Response time for standard requests | 2.8 | 2.7 | 3.3 | 4.1 |
| Score | 2.4 | 3.5 | 2.9 | 3.9 |
| VI. AM Best Rating | | | | |
| Score | 2.6 | 5.0 | 2.6 | 5.0 |

After a purchase decision is made, that information is transmitted back to the value appraisal system to become a part of the market intelligence database and to the "winning" carrier. The value appraisal system will also be able to transmit an on-line application for the selected product to the winning carrier.

It will be apparent to those skilled in the art that various modifications and variation can be made in the system for appraising a life insurance product of the present invention without departing from the spirit or scope of the invention. Thus, it is intended that the present invention cover the modifications and variations of this invention provided they come within the scope of the appended claims and their equivalents

What is claimed is:

1. A method for appraising value of a plurality of life insurance products, comprising:

receiving, by a computer-based value appraising system, risk profile information of a proposed insured;

receiving, by the computer-based value appraising system, information about proposed benefits to be provided and proposed price to be paid, including information about guaranteed amounts and illustrated amounts that depend on assumptions about the future, of each of a plurality of proposed life insurance products;

receiving, by the computer-based value appraising system, information about an ability to meet financial obligations of one or more insurers providing the plurality of life insurance products;

for each life insurance product of the plurality of life insurance products, determining an overall numeric rating reflecting the life insurance product's customer value proposition (CVP), including steps of:

determining, by the computer-based value appraising system, a first numeric rating of the life insurance product's value for money (VFM) based at least on mortality risk information specific to the received risk profile information of the proposed insured and on the illustrated amounts of the life insurance product's proposed benefits and proposed price that depend on the assumptions about the future;

determining, by the computer-based value appraising system, a second numeric rating of the life insurance product's performance under less optimistic assumptions about the future based at least on the life insurance product's guaranteed amounts of the proposed benefits and the proposed price;

determining, by the computer-based value appraising system, a third numeric rating of the financial strength of the insurer providing the life insurance product based at least on the received information about the ability to meet financial obligations of the insurer providing the life insurance product;

applying, by the computer-based value appraising system, a weighting to each of the first, second and third numeric ratings according to the relative importance of the first, second and third numeric ratings; and determining, by the computer-based value appraising system, the life insurance product's customer value proposition (CVP) based at least on the first, second and third weighted numeric ratings; and transmitting an appraisal of the plurality of life insurance products based on the determined customer value propositions (CVP) of the plurality of life insurance products.

2. The method of claim 1, wherein determining the first numeric rating includes determining a internal rate of return of the life insurance product based on empirical lapse and surrender rates.

3. The method of claim 1, wherein determining the first numeric rating includes determining a internal rate of return of the life insurance product based on level lapse and surrender rates.

4. The method of claim 1, wherein determining the first numeric rating includes determining a premium of the life insurance product required to achieve a predetermined objective.

5. The method of claim 1, wherein determining the first numeric rating includes determining an index of product flexibility of the life insurance product.

6. The method of claim 5, wherein the index of product flexibility is based whether the life insurance product includes any of the following features: no-lapse guarantees, term riders, penalty-free withdrawals, preferred loans, refunds of cost insurance charges and persistency bonuses.

7. The method of claim 1, wherein determining the second numeric rating includes determining a ratio of cash surrender value on mid-point assumptions to cash surrender value on current assumptions of the life insurance product.

8. The method of claim 1, wherein determining the second numeric rating includes determining a number of years the life insurance product stays in force at mid-point assumptions.

9. The method of claim 1, wherein determining the second numeric rating includes determining an internal rate of return (IRR) of the life insurance product based on a reduction of premiums paid during a duration of the life insurance product.

10. The method of claim 1, wherein the third numeric rating is determined according to data provided by a rating study.

11. The method of claim 1, wherein determining, for each life insurance product, the overall numeric rating reflecting the life insurance product's customer value proposition (CVP) further includes steps of:
determining, by the computer-based value appraising system, a numeric rating of a management performance of the insurer providing the life insurance product; and
applying a weighting to the management performance numeric rating according to its relative importance, and
wherein determining the life insurance product's customer value proposition (CVP) is further based on the weighted management performance numeric rating.

12. The method of claim 11, wherein determining the numeric rating of the financial status of the insurer providing the life insurance product includes:
determining a five year average return on equity for the life insurance product;
determining a ratio of ordinary life expenses to Generally Recognized Expenses;
determining a five year average annual premium growth rate in excess of expense growth rate for the life insurance product;
determining a five year asset compound annual growth rate for the life insurance product;
determining a maximum earnings deviation for the life insurance product;
determining a ratio of ordinary life expenses to ordinary life premiums for the life insurance product; and
determining a ratio of ordinary life expenses to ordinary life reserves.

13. The method of claim 1, wherein determining, for each life insurance product, the overall numeric rating reflecting the life insurance product's customer value proposition (CVP) further includes the steps of:
determining, by the computer-based value appraising system, a numeric rating of historical interest credited rates for the life insurance product; and
applying a weighting to the historical interest credited rates numeric rating according to its relative importance, and
wherein determining the life insurance product's customer value proposition (CVP) is further based on the weighted historical interest credited rates numeric rating.

14. The method of claim 13, wherein determining the numeric rating of historical interest credited rates for the life insurance product includes calculating the value of a predetermined cash amount at a predetermined date for each of five consecutive years, wherein the value is determined using historical interest credited rates.

15. The method of claim 1, wherein determining, for each life insurance product, the overall numeric rating reflecting the life insurance product's customer value proposition (CVP) further includes the steps of:
determining, by the computer-based value appraising system, a numeric rating of quality of customer service provided by the insurer; and
applying a weighting to the quality of customer service numeric rating according to its relative importance, and
wherein determining the life insurance product's customer value proposition (CVP) is further based on the weighted quality of customer service numeric rating.

16. The method of claim 15, wherein the numeric rating of quality of customer service provided by the insurer is determined according to empirical data from a study of a plurality of insurance providers.

17. The method of claim 1, wherein the first, second and third ratings are converted to a normalized scale before determining the life insurance product's customer value proposition (CVP) based on first, second and third weighted numeric ratings.

18. The method of claim 1, wherein determining the first numeric rating includes:
   determining, by the computer-based value appraising system, a plurality of metrics; and
   applying, by the computer-based value appraising system, a weighting to each of the plurality of metrics according to the relative importance of each metric;
   determining, by the computer-based value appraising system, the first numeric rating based on the weighted plurality of metrics.

19. The method of claim 18, wherein for one of the plurality of metrics, a high point and low point are set, such that if the metric for any product exceeds the high point, then that product's normalized score is set to a first predetermined value, and if the metric is below the low point, then the normalized score is set to a second predetermined value, and if the metric lies between the high and low points, the normalized score is set by linear interpolation.

20. The method of claim 1, wherein the weighting for the first numeric rating is greater than the weighting for the second numeric rating.

21. The method of claim 1, wherein the weighting for the first numeric rating is greater than the weighting for the third numeric rating.

22. The method of claim 1, wherein the weighting for the second numeric rating is greater than the weighting for the third numeric rating.

23. The method of claim 1, wherein the appraisal takes the form of a numerical index, an alphabetic grade, or a descriptive phrase.

24. The method of claim 1, wherein the appraisal is included in rated product proposals transmitted to a distribution channel.

* * * * *

UNITED STATES PATENT AND TRADEMARK OFFICE
CERTIFICATE OF CORRECTION

| | |
|---|---|
| PATENT NO. | : 7,634,420 B2 |
| APPLICATION NO. | : 10/024585 |
| DATED | : December 15, 2009 |
| INVENTOR(S) | : Kendall et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1839 days.

Signed and Sealed this

Ninth Day of November, 2010

David J. Kappos
*Director of the United States Patent and Trademark Office*